US012611752B2

(12) United States Patent
Deshpande et al.

(10) Patent No.: US 12,611,752 B2
(45) Date of Patent: Apr. 28, 2026

(54) INSERTION TOOL

(71) Applicant: Precision Polymer Engineering Limited, Blackburn (GB)

(72) Inventors: Rahul Deshpande, Katy, TX (US);
Samantha Wyatt, Houston, TX (US);
Eric Crawford, Houston, TX (US);
Emmanuel Okeke, New York, NY (US)

(73) Assignee: Precision Polymer Engineering Limited, Blackburn (GB)

( * ) Notice: Subject to any disclaimer, the term of this patent is extended or adjusted under 35 U.S.C. 154(b) by 561 days.

(21) Appl. No.: 17/967,442

(22) Filed: Oct. 17, 2022

(65) Prior Publication Data

US 2023/0117970 A1     Apr. 20, 2023

Related U.S. Application Data

(60) Provisional application No. 63/256,102, filed on Oct. 15, 2021.

(51) Int. Cl.
B25B 27/00          (2006.01)
B23P 19/04          (2006.01)

(52) U.S. Cl.
CPC ........ B25B 27/0028 (2013.01); B23P 19/047 (2013.01)

(58) Field of Classification Search
CPC ........................... B25B 27/0028; B23P 19/047
See application file for complete search history.

(56) References Cited

U.S. PATENT DOCUMENTS

| | | | | |
|---|---|---|---|---|
| 1,968,640 A | * | 7/1934 | Elms | ................... B25B 27/0028 157/1.22 |
| 3,180,015 A | * | 4/1965 | Thompson | .......... B25B 27/0028 29/451 |
| 3,553,817 A | * | 1/1971 | Lallak | ................. B25B 27/0028 29/278 |
| 3,861,020 A | * | 1/1975 | Moewe | ............... B25B 27/0028 29/235 |
| 4,141,129 A | * | 2/1979 | Martini | ................. B23P 19/084 29/235 |
| 5,050,282 A | * | 9/1991 | Zannini | ............... B25B 27/0028 29/235 |
| 6,108,884 A | * | 8/2000 | Castleman | ............ B23P 19/084 29/280 |

(Continued)

*Primary Examiner* — Seahee Hong
(74) *Attorney, Agent, or Firm* — Tucker Ellis LLP; Michael G. Craig

(57) ABSTRACT

An insertion tool may be utilized for placement of a seal into a groove of a component. The insertion tool may comprise a base and a seal lifting portion. The seal lifting portion may comprise a surface configured to selectably engage with a seal to move the seal between a lifted position and an unlifted position within an associated groove of a component. The surface of the seal lifting portion may be configured to continuously move the seal between the lifted position and unlifted position. The seal may have a first height $h_1$ and a second height $h_2$, wherein $h_2$ may be less than $h_1$. The seal may be stretched to $h_2$ in the lifted position and returned to $h_1$ in the unlifted positioned in the associated groove of the component.

15 Claims, 42 Drawing Sheets

(56) References Cited

U.S. PATENT DOCUMENTS

| | | | | |
|---|---|---|---|---|
| 6,640,405 | B2 * | 11/2003 | Ino | B62D 55/21 |
| | | | | 29/451 |
| 6,964,089 | B2 * | 11/2005 | Ramirez | B25B 27/205 |
| | | | | 29/268 |
| 6,971,150 | B1 * | 12/2005 | Heath | B23P 19/084 |
| | | | | 29/451 |
| 9,440,319 | B2 * | 9/2016 | Yamanaka | F16J 15/3268 |

\* cited by examiner

100

146, 146a

144a

144b

108a 108,110

140,540

INSERTION TOOL

CROSS-REFERENCE TO RELATED APPLICATIONS

This application claims priority to U.S. Provisional Ser. No. 63/256,102, entitled INSERTION TOOL, filed Oct. 15, 2021, which is incorporated herein by reference.

BACKGROUND

Seals are frequently used in industry as an inexpensive and reliable way to prevent the entrance of external contaminants such as dust and dirt as well as preventing the leakage of liquids and/or gases. Seals may be static or dynamic depending on its application. Seals may take the form of a variety of cross sections also depending on the desired application, such as circular, x-shaped, or square shaped. A variety of seals is available for use such as o-rings, gaskets, bellows, diaphragms, sealing/wiper lips and others. A seal may be made from an elastomer and be designed to be seated in a groove and compressed during assembly between two or more parts, creating a seal at the interface.

Various components may use seals, including without limitation, electrostatic chucks, pumps, cylinders, connectors, and valves. In such components, a groove may be defined for the placement of a seal. For example, electrostatic chucks are used for gripping and transporting delicate articles such as silicon wafers and metal foils and films, often for industrial applications. Such a seal may be used to protect a gap between the components of the electrostatic chuck from dirt and other debris, and/or to protect a bond layer between ceramic and metal elements.

When a seal is inserted into a groove, the seal may not have a uniform fit within the groove. An operator may use a flattening jig to tap on the top of the seal and force the seal into the groove. In the example of an elastomeric seal and electrostatic chuck, elastomeric seal placement may result in wrinkles in the seal and current practice is to apply force to the wrinkles or bulges to flatten and remove the wrinkles. One drawback of the use of the flattening jig is that it may result in the displacement of elastomeric seal, which can lead to premature failures due to high compressive or tensile forces. Upon forcing the elastomeric seal into the groove, the compressive stresses may cause cracking at the centerline of the e-seal.

Accordingly, there is a need in the industry for an alignment tool that quickly and easily positions a seal into a desired location. There is also a need in the industry for an alignment tool that quickly and easily inserts an elastomeric seal into an electrostatic chuck with no added compressive forces by stretching the electrostatic seal well below its plastic region on a Stress-Strain curve but enough to remove any points of high stress.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, an insertion tool may be utilized for placement of a seal into a groove of a component. The insertion tool may comprise a base and a seal lifting portion. The seal lifting portion may comprise a surface configured to selectably engage with a seal to move the seal between a lifted position and an unlifted position within an associated groove of a component. The surface of the seal lifting portion may be configured to continuously move the seal between the lifted position and unlifted position. The seal may have a first height $h_1$ and a second height $h_2$, wherein $h_2$ may be less than $h_1$. The seal may be stretched to $h_2$ in the lifted position and returned to $h_1$ in the unlifted position positioned in the associated groove of the component.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
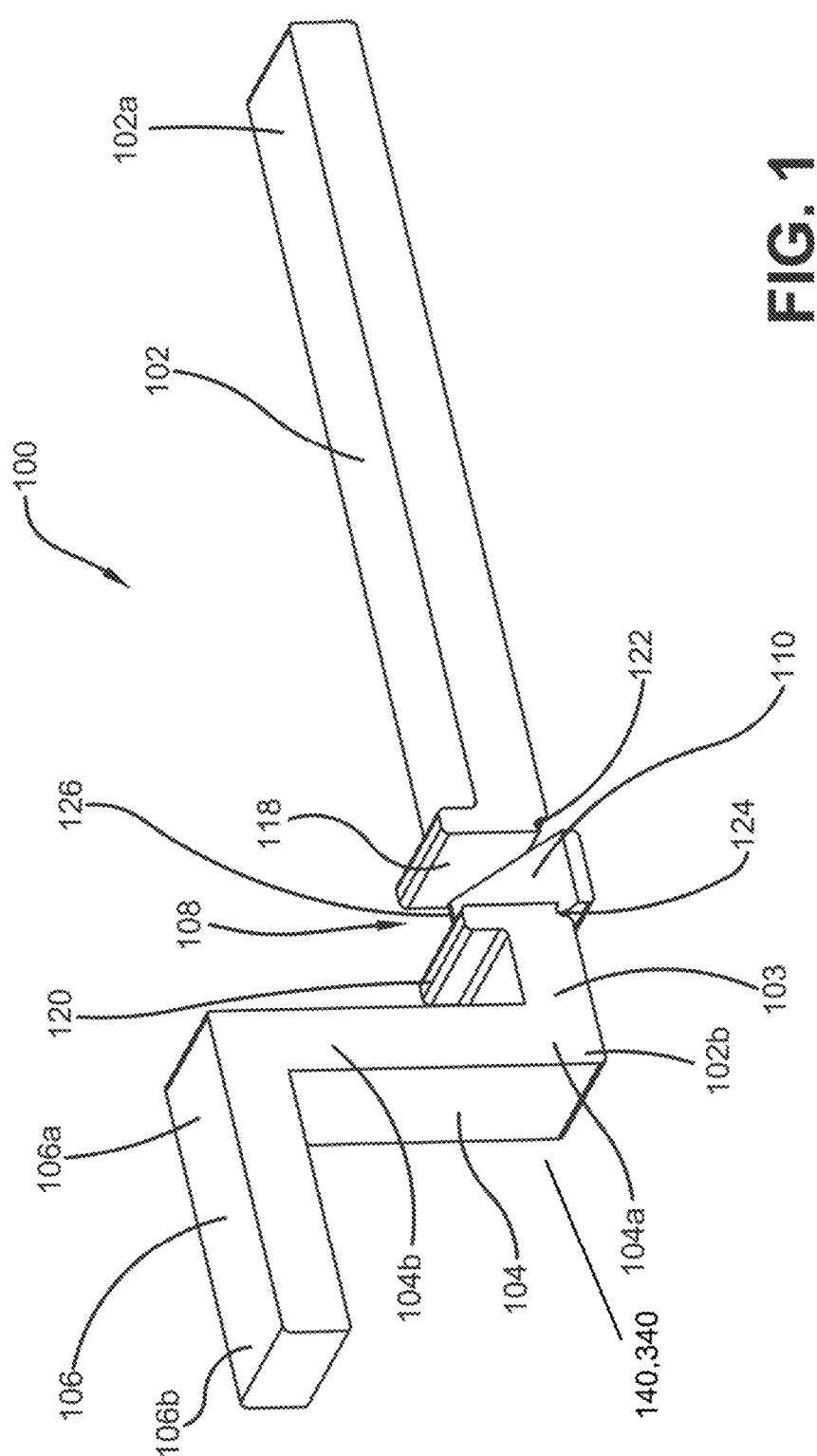
FIG. 1 is a perspective view of one implementation of a tool.
Figure 2:
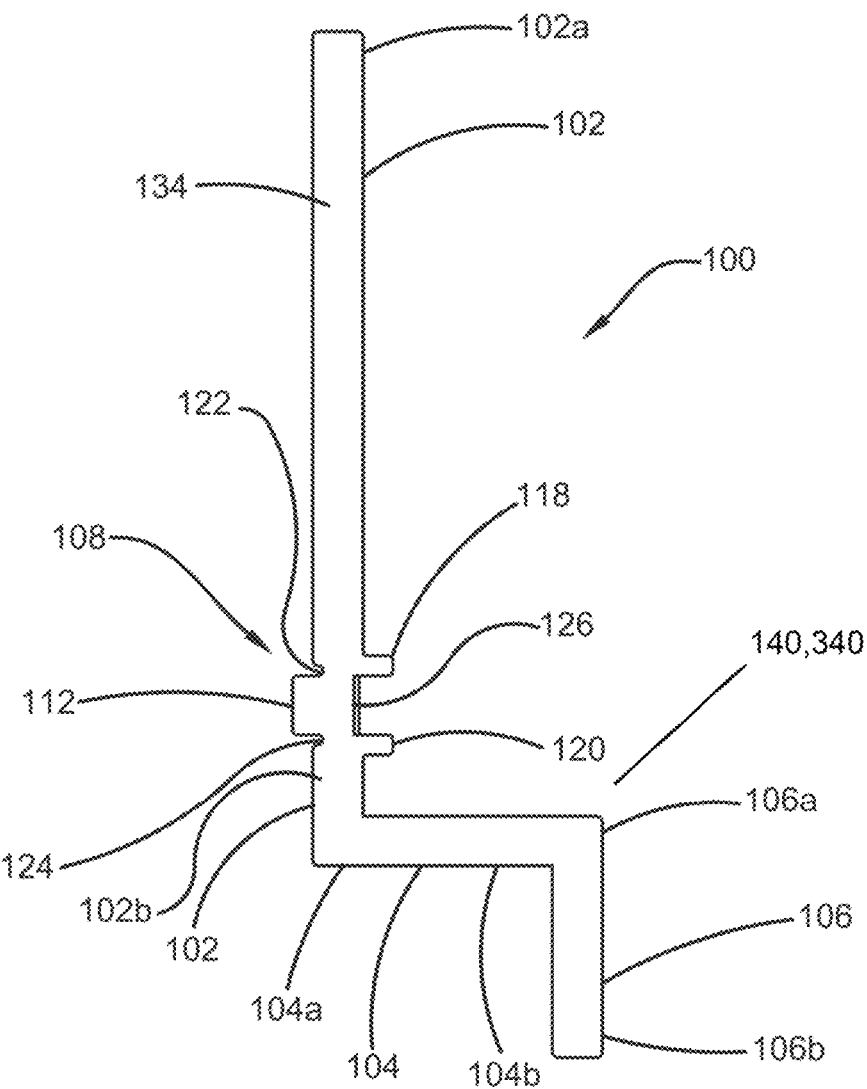
FIG. 2 is a left side view of FIG. 1.
Figure 3:
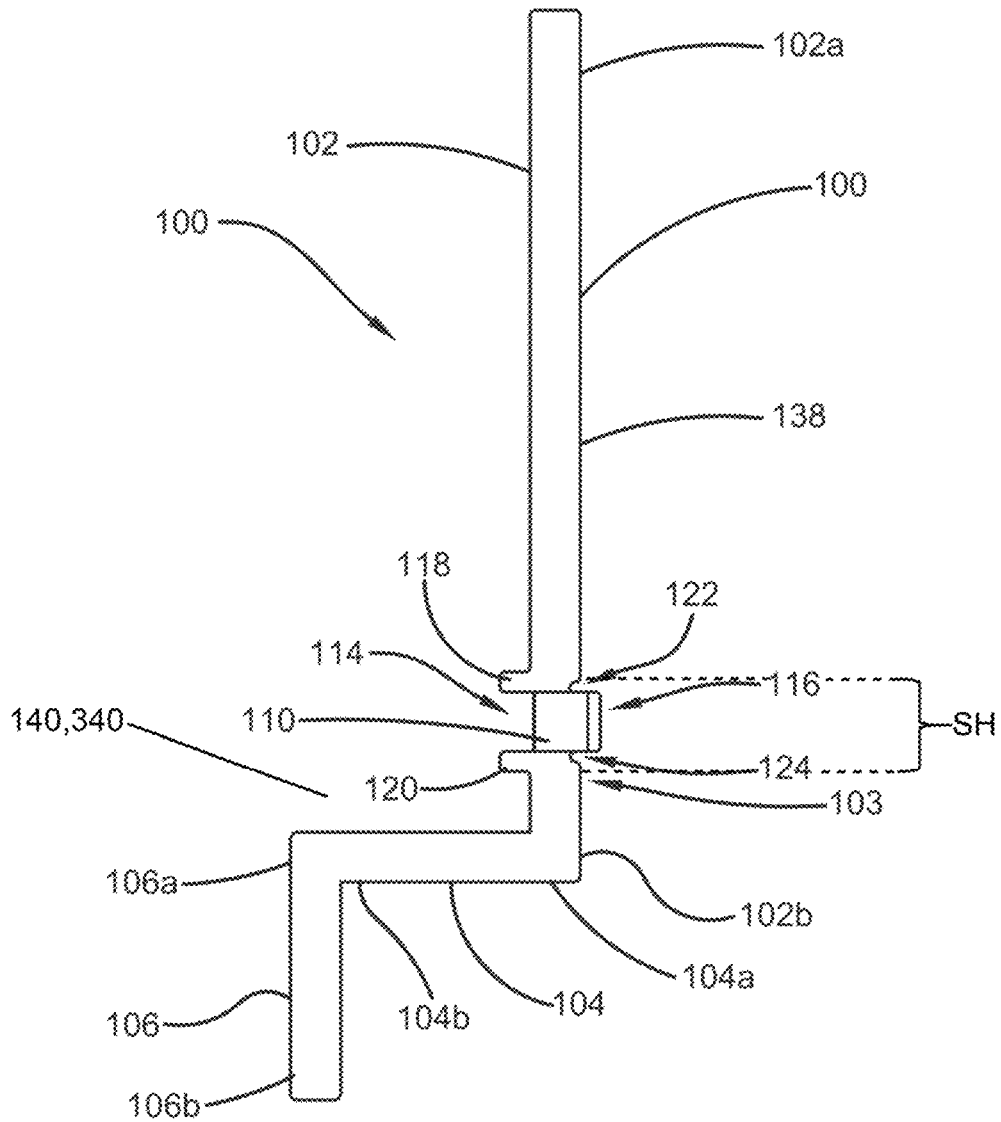
FIG. 3 is a right side view of FIG. 1.
Figure 4:
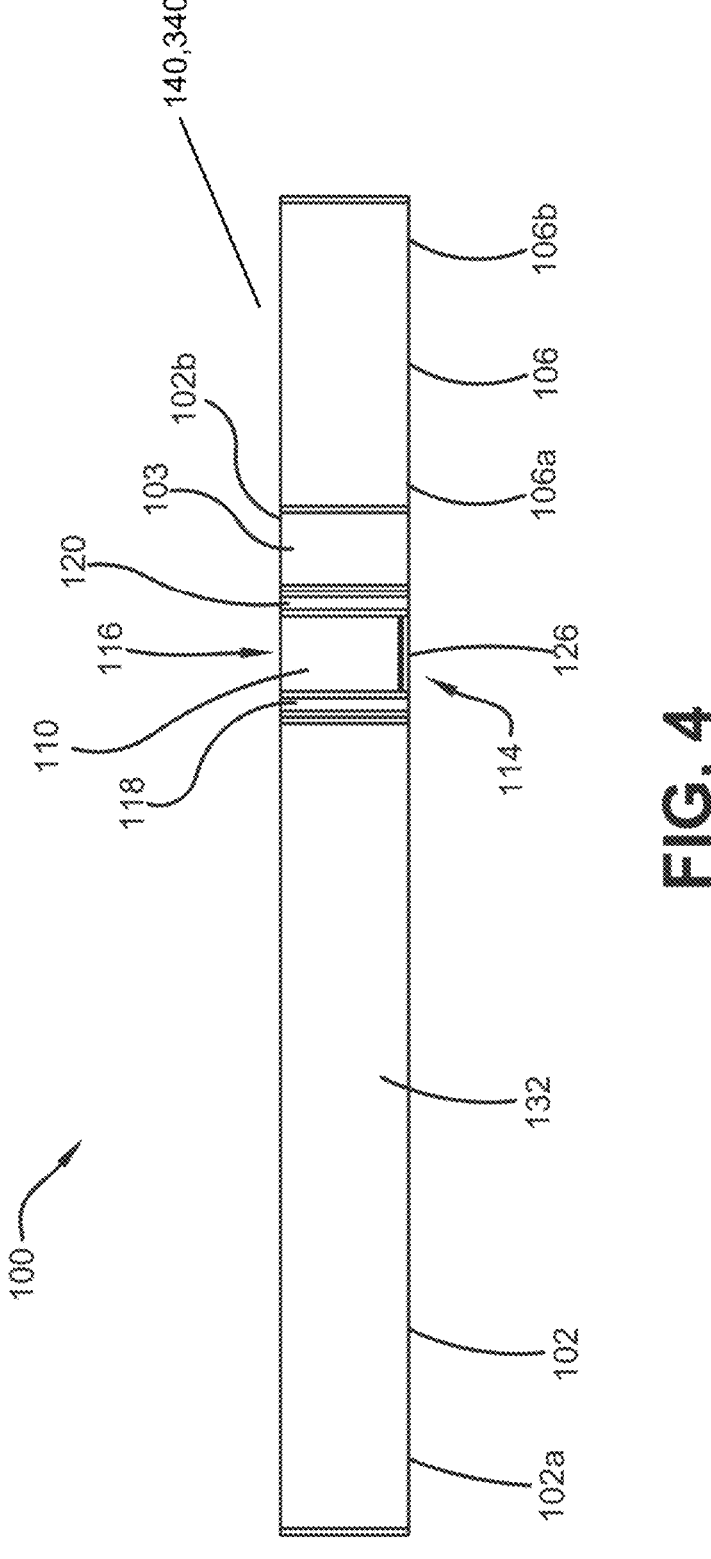
FIG. 4 is a front view of FIG. 1.
Figure 5:
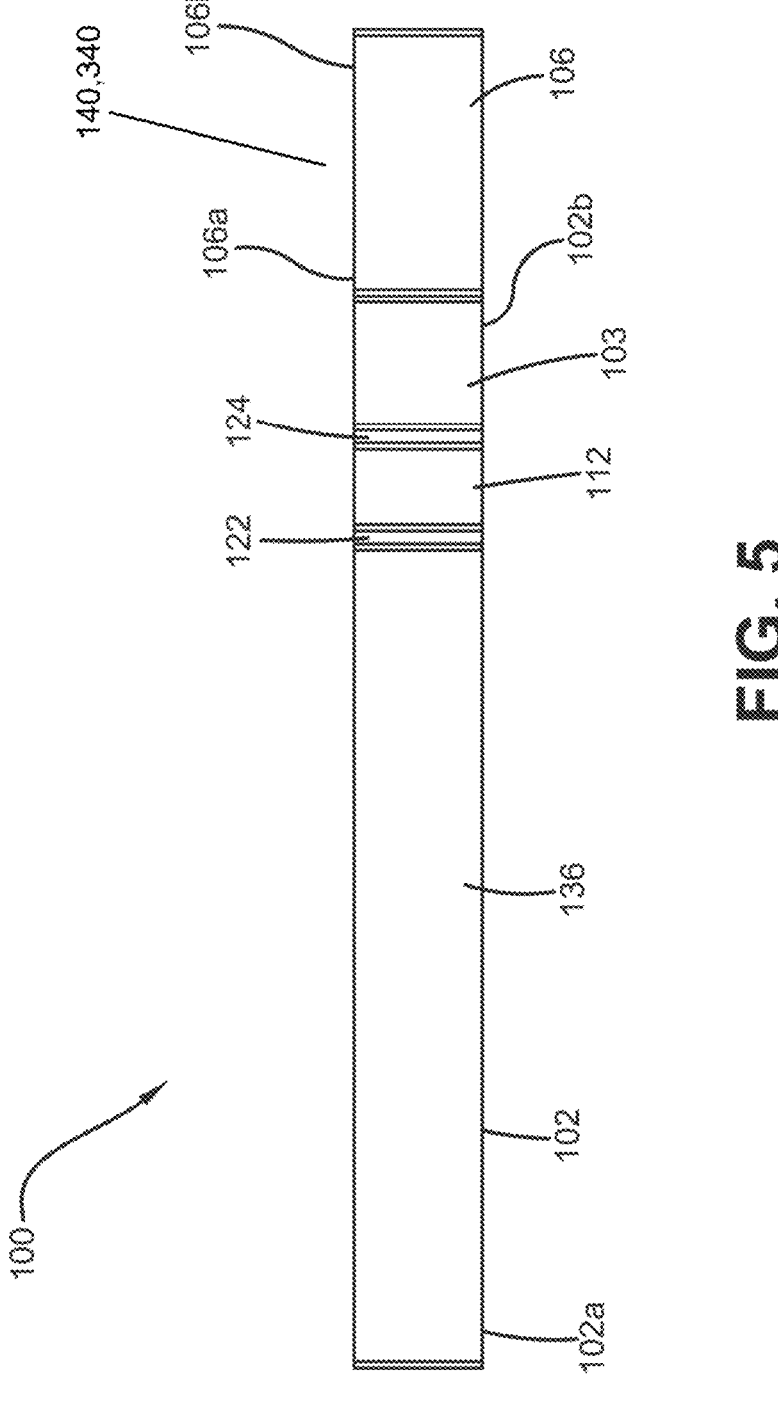
FIG. 5 is a rear view of FIG. 1.
Figure 6:
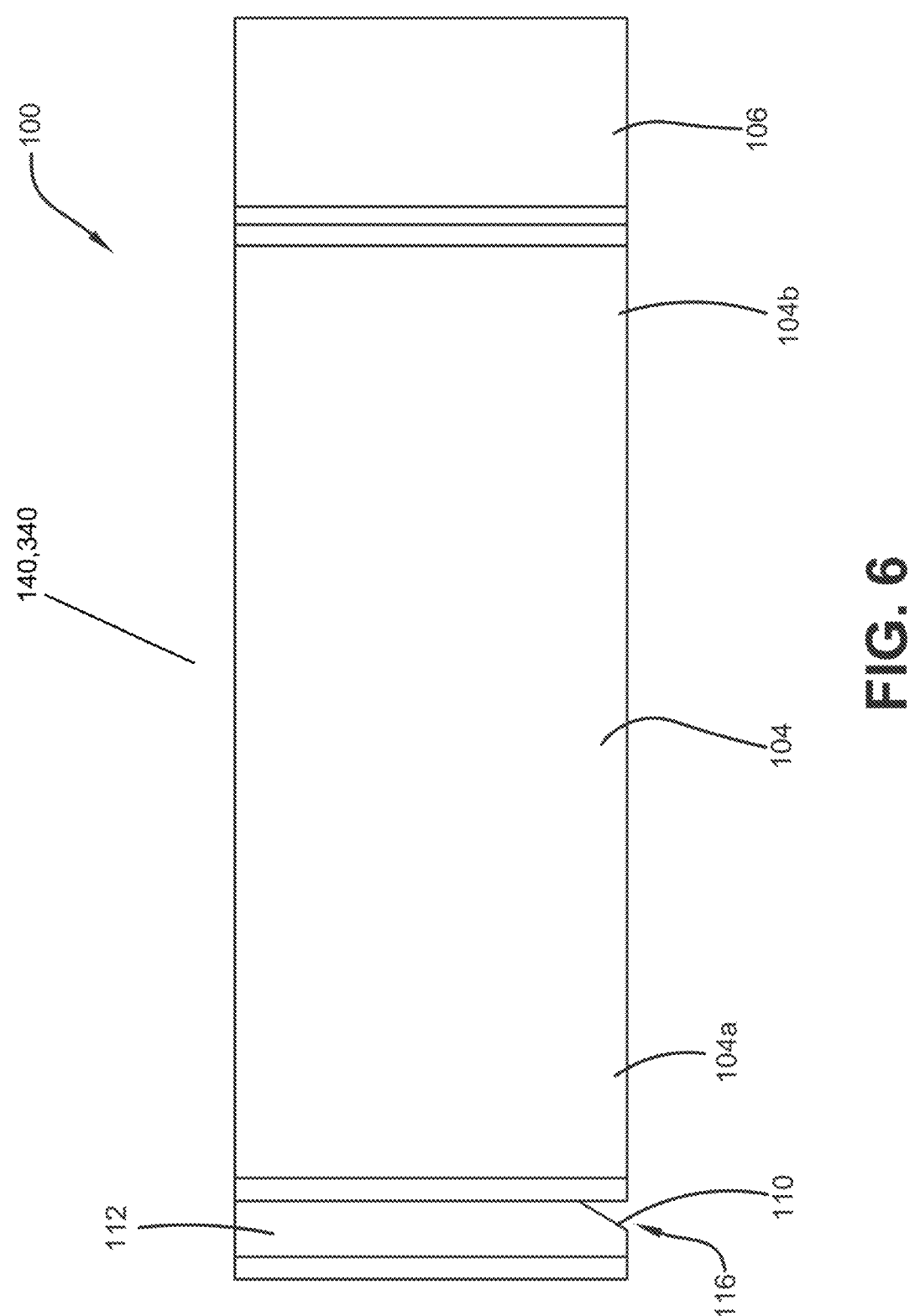
FIG. 6 is a bottom view of FIG. 1.
Figure 7:
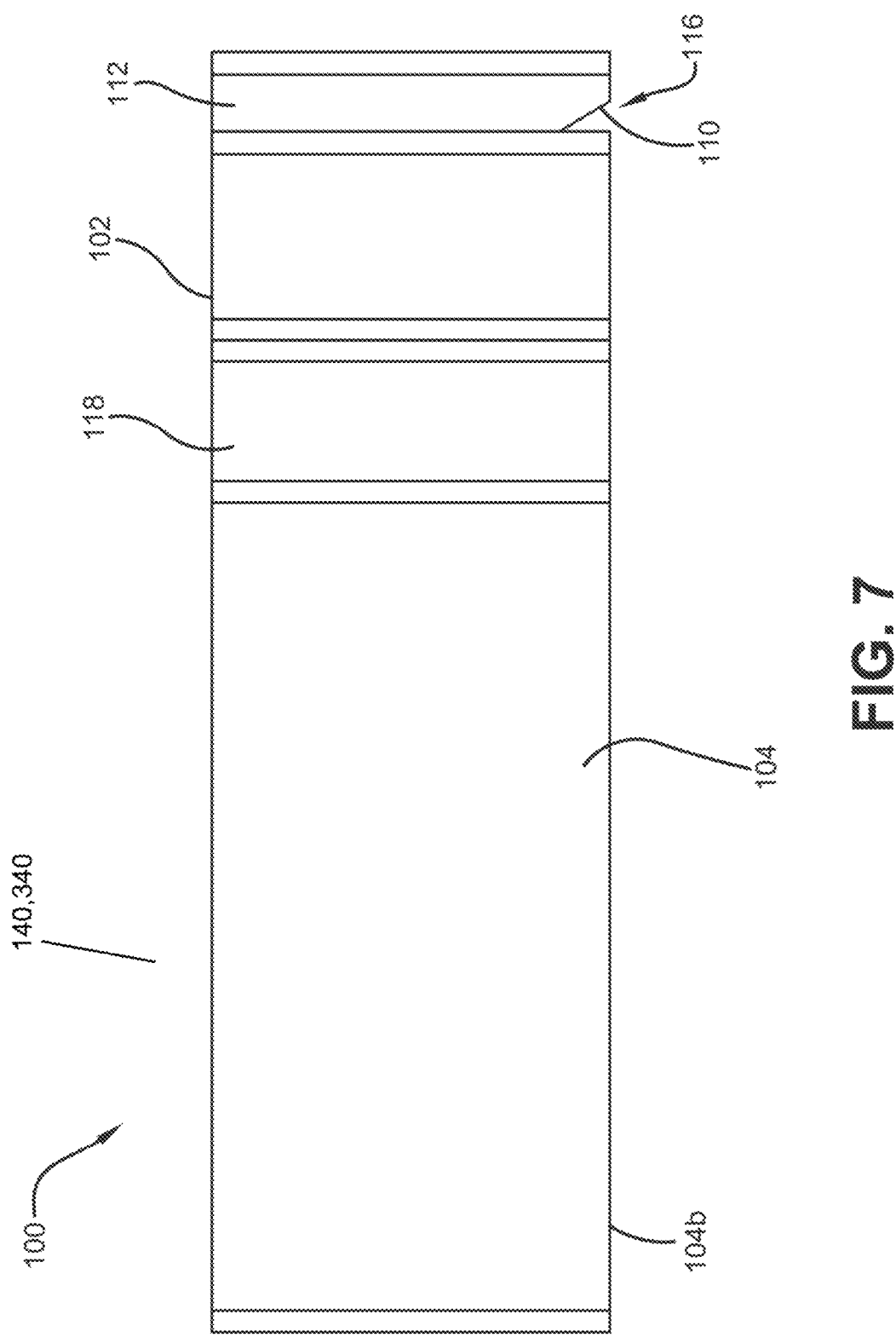
FIG. 7 is a top view of FIG. 1.
Figure 8:
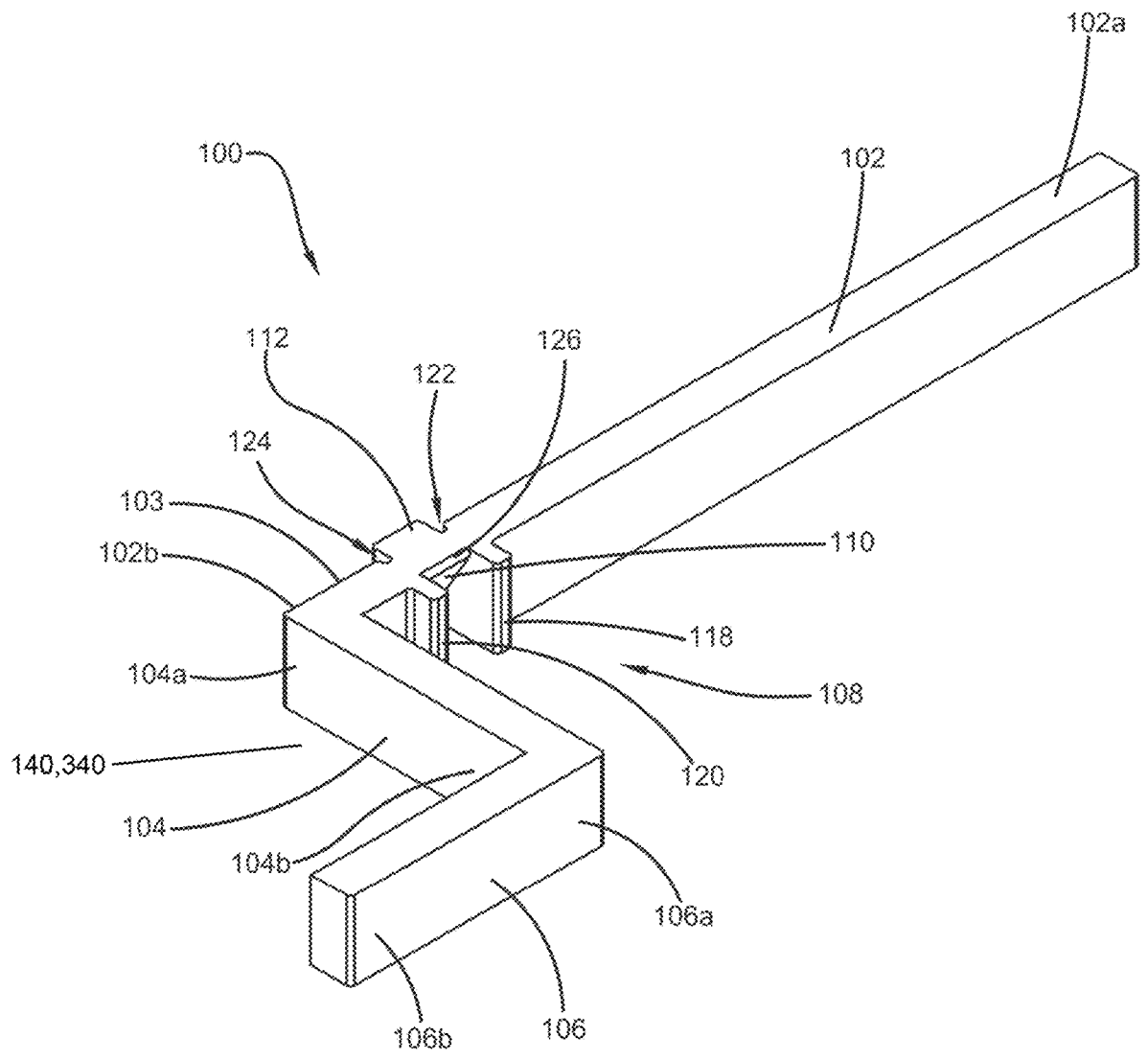
FIG. 8 is another perspective view of FIG. 1.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

An insertion tool 100 may be utilized to assist with positioning seals 300 into a desired location of a target component 302. Use of the insertion tool 100 provides for faster and easier installation of the seal 300. The desired location may be a groove 304, channel, or other seating location of a target component 302. Usage of the insertion tool 100 may assist with installation of any seal 300, such as o-rings, gaskets, bellows, diaphragms, sealing/wiper lips and others without introducing additional compressive forces. The seals 300 may be static or dynamic. Utilization of the insertion tool 100 more evenly distributes internal stresses within the seal 300. The insertion tool 100 also provides for more even placement within the desired location, such as the groove 304. Target components 302 utilizing seals 300, and thus benefiting from the insertion tool 100, may include without limitation, those for shafts, pumps, glands, cylinders, connectors, valves, or other components.

With reference to the FIGURES, the insertion tool 100 may comprise a base 140 operably connected to a seal lifting portion 108. The seal lifting portion 108 may comprise a surface 110 configured to selectably engage with a seal 300 to move the seal 300 between a lifted position and an unlifted position within the associated groove 304 of the component 302. In another implementation, the surface 110 of the seal lifting portion 108 may be further configured to continuously move the seal 300 between the lifted position and the unlifted position as the insertion tool 100 moves about the perimeter of the target component 302. In some implementations, the operator may utilize the insertion tool 100 for one, two, three or more rotations about the perimeter of the target component 302 to properly seat the seal 300.

The shape or profile of the seal lifting portion 108 may take any form chosen with sound engineering judgement, and may include without limitation, an angled surface, a ramp surface, a flat surface, an arcuate surface, a frustoconical surface, or other shape. FIGS. 35a-d are top views of cross sections of non-limiting implementations of the seal lifting portion 108. The seal lifting portion 108 may be spherical having a circular cross section (FIG. 35a), cylindrical having a circular cross section (FIG. 35a), substantially trapezoidal (FIG. 35b), semi-cylindrical having a semi-circular cross section (FIG. 35c), substantially triangular (FIG. 35d), some other geometry, or a combination of the same. Accordingly, the surface 110 of the seal lifting portion 108 may take the form of an arc, sphere, angled surface, plurality of angled surfaces, another geometry, or a combination of the same.

As shown in the FIGURES, the surface 110 of the seal lifting portion 108 may have a thicker portion 114 and a thinner portion 116. The thicker portion 114 may be configured to move the seal 300 to the lifted position. The thinner portion 116 may be configured to guide the seal 300 to the unlifted position in the associated groove 304 of the component 302. As shown in the FIGURES, the seal lifting portion 108 may comprise a surface 110 taking the form of a ramp.

As the seal 300 is moved between an unlifted position and a lifted position by the thicker portion 114, the seal 300 may be stretched by a percentage below its stress-strain curve. The seal 300 may have a first height, $h_1$, in an unlifted position, and a second height, $h_2$, in the lifted position. The first height, $h_1$, may be greater than the second height, $h_2$. The thickness of the thicker portion 114, the thinner portion 116, and the desired height $h_2$ of the stretched seal 300 may be determined by sound engineering judgement. The seal lifting portion may have a surface height SH. The surface height SH may be sized and configured to vary per application depending on the target component 302 and seal 300 type. Depending on the geometry of the seal 300 being positioned in the groove 304 or channel of a target component 302, the seal height SH may change on the insertion tool 100 to effectively move the seal 300 between the lifted and unlifted positions to properly and effectively seat the seal 300 in the groove 304 or channel or other target position.

The shape or profile of the base 140 may take any form chosen with sound engineering judgement. As shown in the FIGURES, the base 140 may take the form of a linear segment, a triangular prism, a substantially trapezoidal shape, a rectangular prism, an arcuate blended portion, a semi-circular prism, a hexagonal prism, an octagonal prism, or some other geometry, not limited thereto. The internal make-up of the base 140 may take any form chosen with solid engineering judgement, and may be without limitation, solid, hollow, hatched, or honeycombed. With continued reference to the FIGURES, the base 140 may comprise a first end 140*a* and a second end 140*b*. The seal lifting portion 108 may be disposed proximate the first end 140*a* of the base 140. The base 140 may further comprise a rear surface 142 proximate the second end 140*b* of the base 140. At least a portion of the rear surface 142 may be positioned to directly contact the component 302. By having at least a portion of the rear surface 142 being positioned to directly contact the component 302, the distance between the first end 140*a* of the base 140 and the second end 140*b* of the base 140 may be configured to maintain a substantially consistent distance between the seal lifting portion 108 and the associated groove 304 of the component 302. The substantially consistent distance may be determined using sound engineering judgement based on a number of factors including the thickness of the thicker portion of the seal lifting portion 108, the stress-strain curve of the seal 300, and the desired height $h_2$ of the seal 300 upon being moved into the lifted position.

In one implementation, as shown in FIGS. 1-18, the base 140,340,440 may be a linear segment. In another implementation, as shown in FIGS. 19-26, the base 140,540 may be a substantially trapezoidal shape, wherein the second end 140*b*,540*b* of the base 140,540 has a width greater than a width of the first end 140*a*,540*a* of the base 140,540. In yet another implementation, as shown in FIGS. 27-30, the base 140,640 may be a substantially trapezoidal shape, wherein the second end 140*b*,640*b* of the base 140,640 has a width greater than a width of the first end 140*a*,640*a* of the base 140,640 and the distance between the first end 140*a*,640*a* of the base 140,640 and the second end 140*b*,640*b* of the base 140,640 is less than that of the implementation shown in FIGS. 19-26.

In one implementation, the rear surface 142 may be shaped to compliment a geometry of the component 302. For example, as shown in FIGS. 1-18, the rear surface 142,342, 442 may be a linear segment to compliment at least a portion of a round, rectangular, or angular component 302. As shown in FIGS. 19-34, the rear surface 142,542,642,742 may be an arcuate shape to compliment a round, curved, or radial component 302. In other implementations, the rear surface 142 may be linear, elliptical, ovoid, angular, or some other geometry depending on the geometry of component 302 to which it may compliment.

In another implementation, as shown in FIGS. 19-34, a portion of the second end 140*b*,540*b*,640*b*,740*b* of the base 140,540,640,740 and the rear surface 142,542,642,742 may extend down a height H. In one implementation, the entire base 140 may extend down a height H. The height H of the base 140 or the rear surface 142 of the base 140 may be sized to provide the rear surface 142 a surface area such that at least a portion of the rear surface 142 may be maintained against the component 302. The surface area of the rear surface 142 may be sized to increase the amount of contact between the rear surface 142 and the component 302. An increased amount of contact between the rear surface 142 and the component 302 may provide greater stability when using the insertion tool 100. Greater stability when using the insertion tool 100 may be beneficial when inserting a seal 300 having a high elastic resistance.

In another implementation, as shown in FIGS. 38-42, the base 140,840 may be disposed proximate a first end 108*a* of the seal lifting portion 108. In such an implementation, the base 140,840 may further comprise a rear surface 142,842 proximate the first end 140*a*,840*a* of the base 140,840. At least a portion of the rear surface 142,842 may be positioned to directly contact the component 302. By having at least a portion of the rear surface 142,842 proximate the first end

140*a*,840*a* of the base 140,840 being positioned to directly contact the component 302, the insertion tool 100 may be disposed to be supported by the component 302. As shown in FIGS. 38-42, the rear surface 142,842 may comprise a at least one linear segment, angled segment, curved segment, or a combination of the same disposed to compliment a component 302 having a lip, overhang, another protruding feature, or some other geometry.

In one example, an insertion tool 100 may be utilized to assist with insertion of electrostatic seals 200 having an elastomer into electrostatic chucks 202. Use of the insertion tool 100 provides for faster and easier installation of the electrostatic seal 200 within a groove 204 of the electrostatic chuck 202 without introducing additional compressive forces. Utilization of the insertion tool 100 more evenly distributes internal stresses within the electrostatic seal 200, and thus, within the elastomer of the electrostatic seal 200.

The insertion tool 100 may dispose the electrostatic seal 200 within the groove 204 of the electrostatic chuck 202 and simultaneously relieve points of high internal stress. The insertion tool 100 may be hand actuated. In another implementation, the insertion tool 100 may be actuated by machine, robot, or other automated process. In use, the operator (or automated device) may maneuver the insertion tool 100 around a perimeter 210 of the electrostatic chuck 202 at a substantially constant velocity. In use, the electrostatic seal 200 is stretched by a percentage that is below its plastic region on a stress-strain curve but enough to remove any points of high stress. In another implementation, the insertion tool 100 may align the electrostatic seal 200 in a center of the groove 204 and eliminate displacement that could cause premature failures due to higher than desirable compressive forces. The insertion tool 100 is configured to seat the electrostatic seal 200 without additional compressive forces on the elastomer of the electrostatic seal.

The electrostatic seal 200 may be made up of a variety of materials including, but not limited to, elastomers, fluoropolymers such as polytetrafluoroethylene, hard rubbers, carbon fibers, and other plastic polymers. The insertion tool 100 may also be made up of a variety of materials including, but not limited to, plastics, metals, ceramics, carbon fibers, glass, and other polymers. Further, while the insertion tool 100 disclosed herein has been described, as being used in association with electrostatic seals 200 and electrostatic chucks 202, the insertion tool 100 is also applicable in the placement and insertion of other seals and seal arrangements.

With references to FIGS. 1-18, an insertion tool 100 may be utilized for placement of an electrostatic seal 200 into a groove 204 of an electrostatic chuck 202. The insertion tool 100 may comprise a first segment 102 comprising a first end 102*a* and a second end 102*b*. A second segment 104 may comprise a first end 104*a* and a second end 104*b*. The first end 104*a* of the second segment 104 may be operably connected to the second end 102*b* of the first segment 102. A third segment 106 may comprise a first end 106*a* and a second end 106*b*. The first end 106*a* of the third segment 106 may be operably connected to the second end 104*b* of the second segment 104. The first segment 102 may comprise a seal lifting portion 108 configured to selectably engage with an electrostatic seal 200 to move the electrostatic seal 200 between a lifted position and an unlifted position within a groove of an electrostatic chuck 202.

In one implementation, the first segment 102 may be angularly connected to the second segment 104. For example, the angle formed between the first segment 102 and the second segment 104 may be between about 80 degrees and 100 degrees. In another implementation, the angle may be about 90 degrees. In another implementation, the second segment 104 may be angularly connected to the third segment 106. For example, the angle formed between the second segment 104 and the third segment 106 may be between about 80 degrees and 100 degrees. In another implementation, the angle may be about 90 degrees. In an example implementation, the angle between the second segment 104 and the third segment 106 may correspond to a profile of the electrostatic chuck 202.

The seal lifting portion 108 may be disposed anywhere along a length L of the first segment 102. As shown in the FIGURES, the seal lifting portion 108 may be proximate the second end 102b of the first segment 102. The first segment may have a cross section of any shape chosen with sound engineering judgment. The cross section may be circular, square, rectangular, triangular, or any other polygonal shape. As shown in the FIGURES, the first segment 102 may have a first surface 132, a second surface 134, a third surface 136, and a fourth surface 138. The seal lifting portion 108 may comprise a surface 110 proximate the first surface 132 of the first segment 102. The surface 110 may take the form of a ramp comprising a thicker portion 114 adjacent to the second surface 134 of the first segment 102. The surface 110 may have a thinner portion 116 adjacent to the fourth surface 138 of the first segment 102. As shown in the FIGURES, the surface 110 increases in thickness from the fourth surface 138 towards the second surface 134 of the first segment 102. The thicker portion 114 may be a lifting end terminating in a lip portion 126, which may dispose the electrostatic seal 200 in its lifted position. The thinner portion 116 may be a placement end configured to guide the electrostatic seal 200 to the unlifted position in the groove 204 of the electrostatic chuck 202.

With continued reference to the FIGURES, the first segment may further comprise guides 118,120 extending from the first surface 132. The guides 118,120 extend on either side of the surface 110 or ramp. The guides 118,120 are configured to maintain placement of the electrostatic seal 200 against at least a portion of the surface 110 as the insertion tool 100 is moved around the perimeter 210 of the electrostatic chuck 202.

The first segment 102 may further comprise a protrusion 112 extending from the third surface 136. The protrusion 112 and third surface 136 may define a first groove 122 and a second groove 124 there between. In one implementation, the protrusion 112 may be oppositely disposed from the surface 110 or ramp. The protrusion 112 may provide additional surface area, and thus, rigidity to support the electrostatic seal 200 as it is lifted and travels along the surface 110.

With reference to the FIGURES, the first segment 102 may have a lower portion 103 extending proximate the second end 102b of the first segment 102 to the second groove 124. The length of the lower portion 103 may correspond to the height from a bottom portion 206 of the electrostatic chuck 202 to the groove 204.

Figure 9:
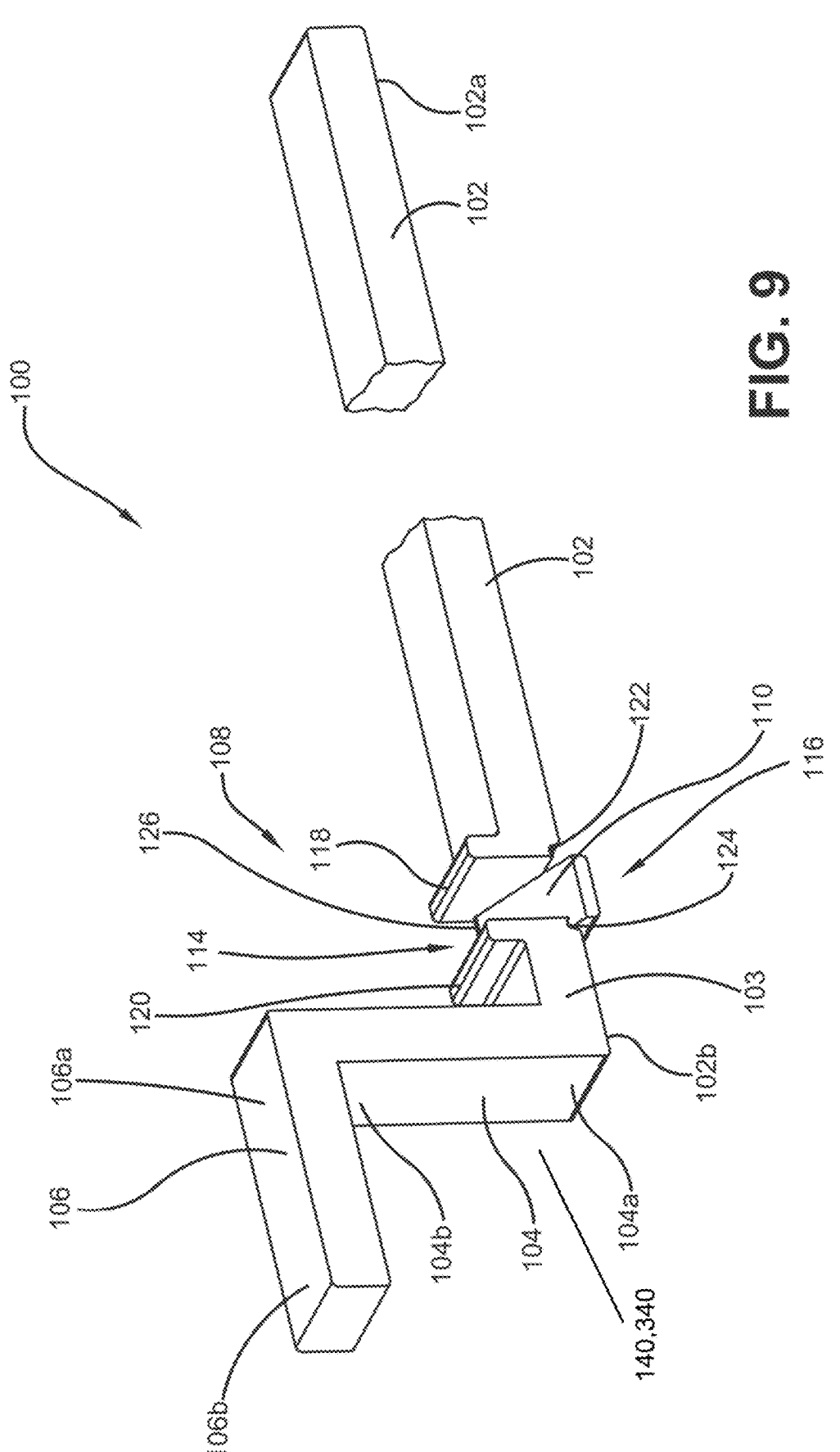
FIG. 9 is a perspective view of another implementation of a tool.
Figure 10:
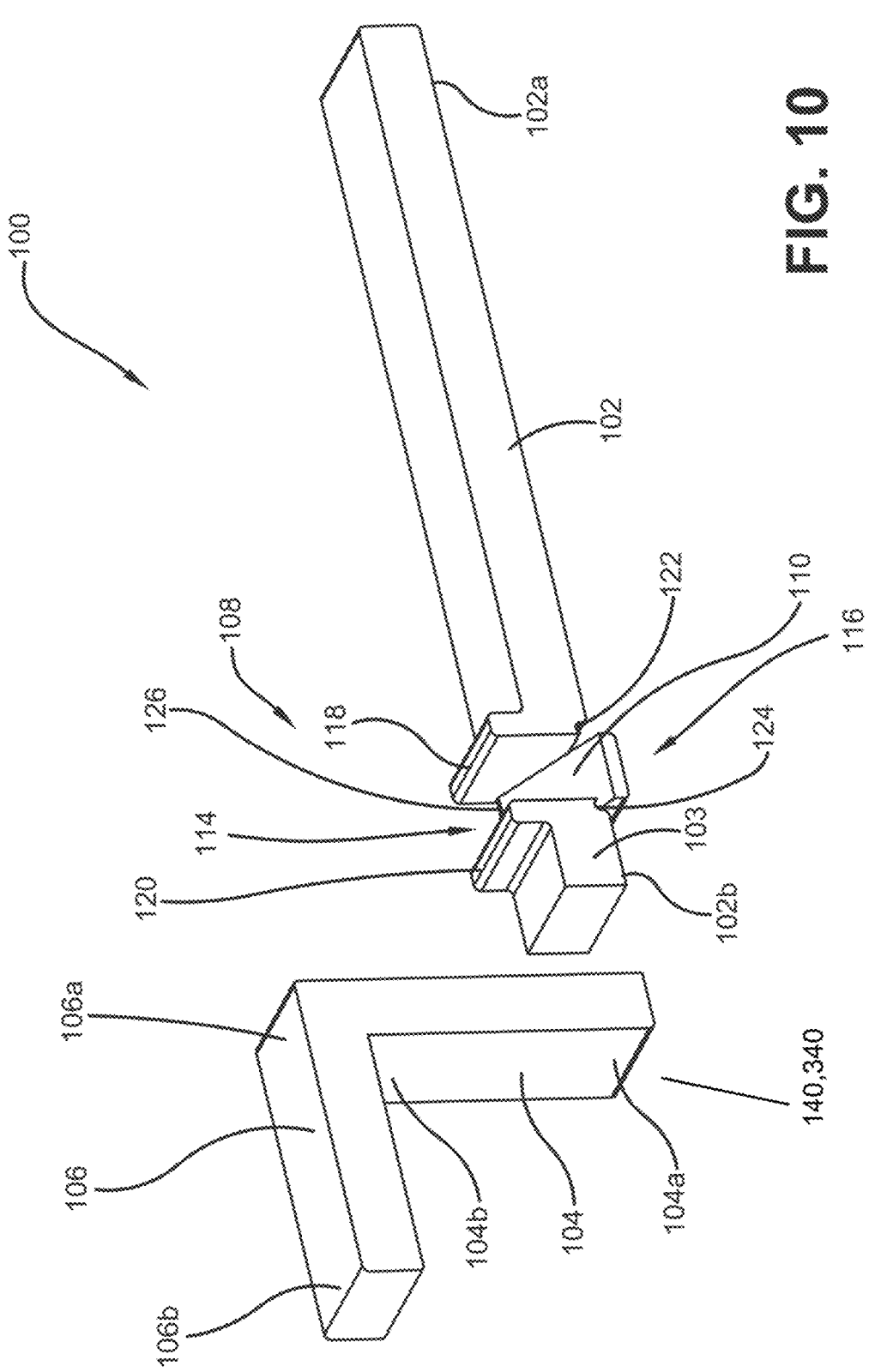
FIG. 10 is a perspective view of another implementation of a tool.
Figure 11:
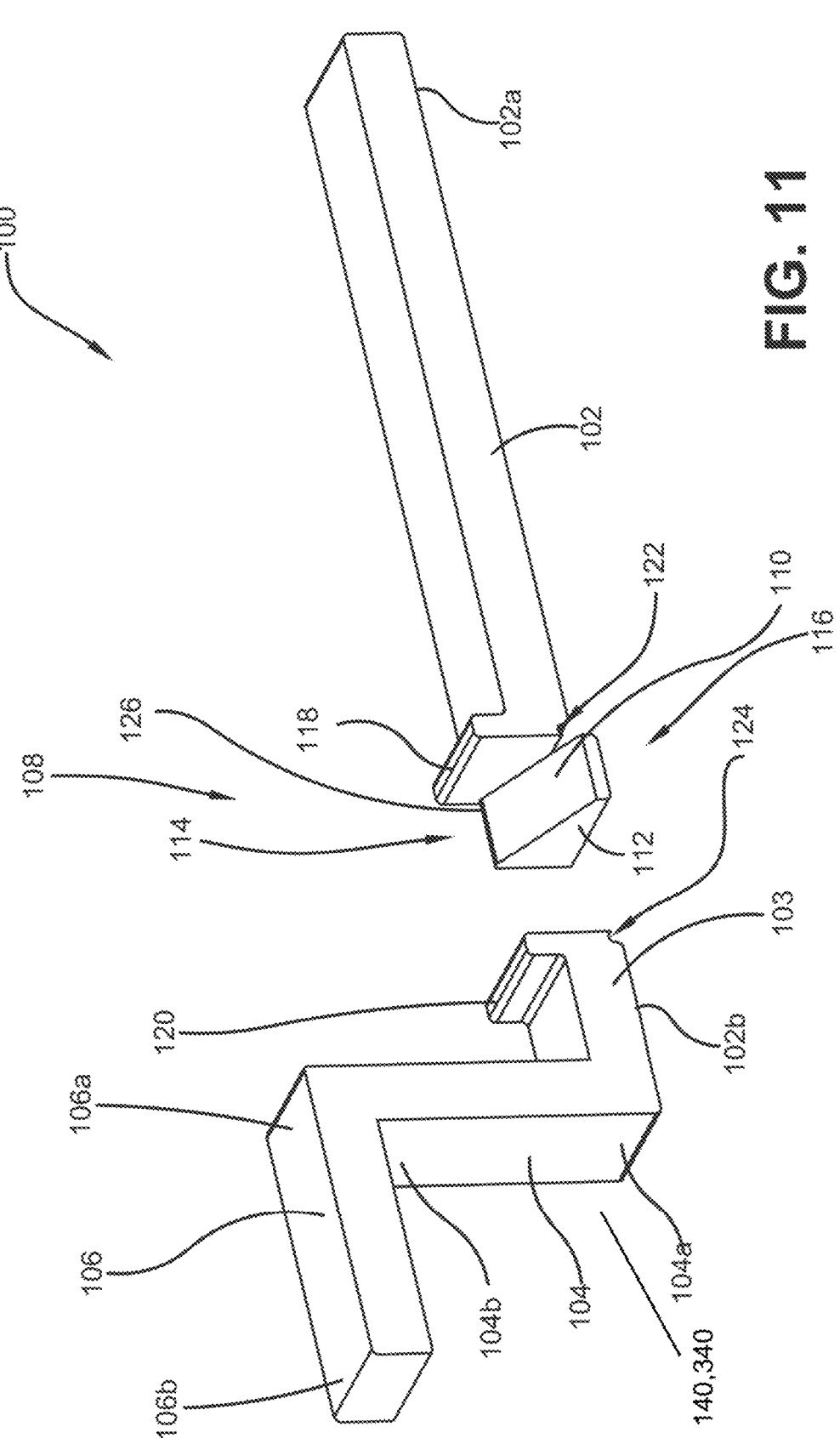
FIG. 11 is a perspective view of another implementation of a tool.
Figure 12:
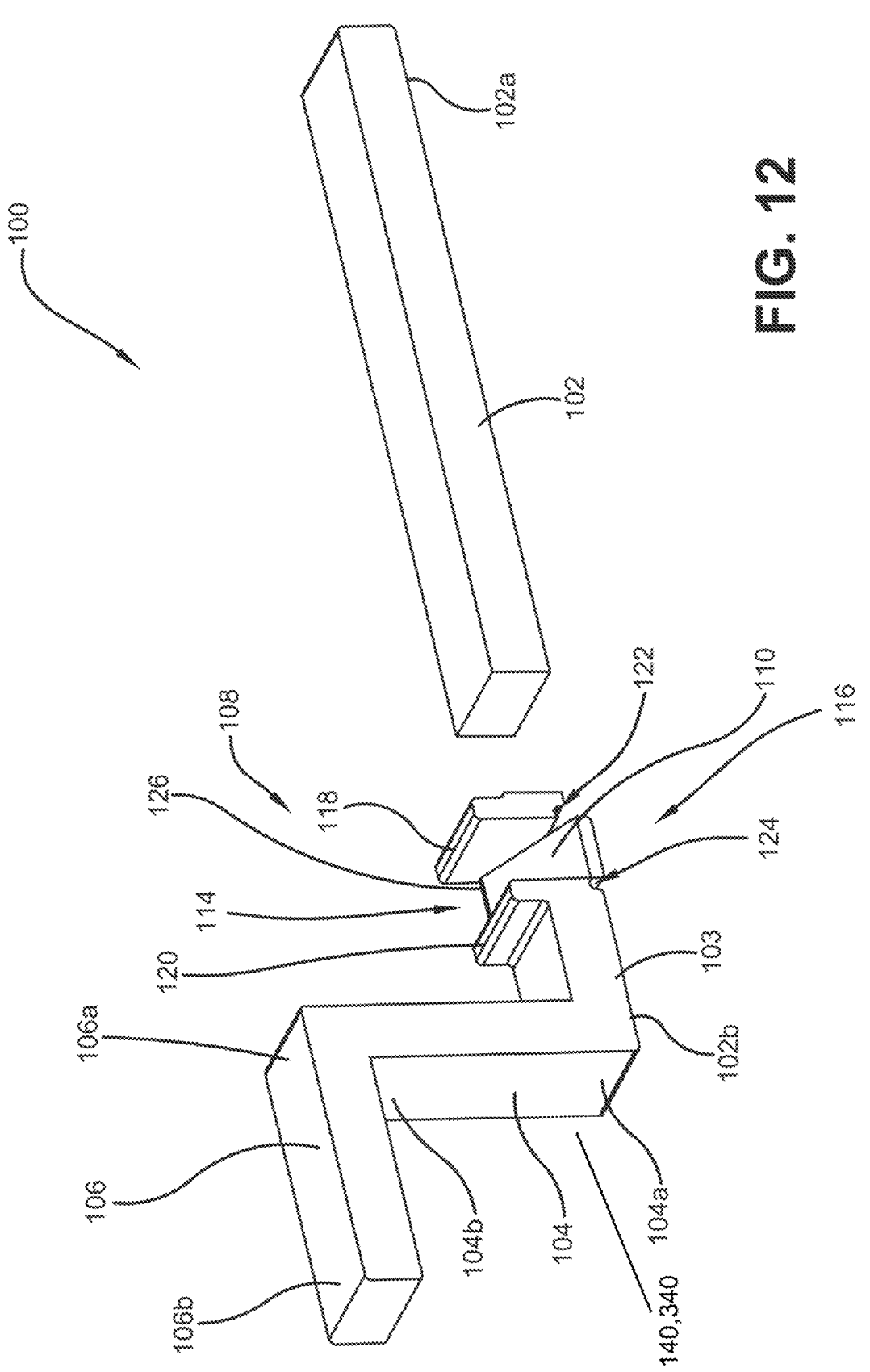
FIG. 12 is a perspective view of another implementation of a tool.

In yet another implementation, the insertion tool 100 may be one unitary piece. In another implementation, the insertion tool 100 may be two or more pieces. As shown in the FIGURES, the first segment 102 may be separable at some portion along its length. As shown in FIG. 9, the first segment 102 may be separable at a joint above the first guide 118. In another implementation shown in FIG. 10, the first segment 102 may be separable from the second segment 104 such that the joint is proximate the second end 102b of the first segment 102 and the first end 104a of the second segment 104. In yet another implementation as shown in FIG. 11, the first segment 102 may be separable at some point in the seal lifting portion 108. For example, it may be separable at a location of the surface 110 and one of the guides 118,120. FIG. 12 illustrates yet another example where the first segment 102 may be separable adjacent the first guide 118.

Figure 13:
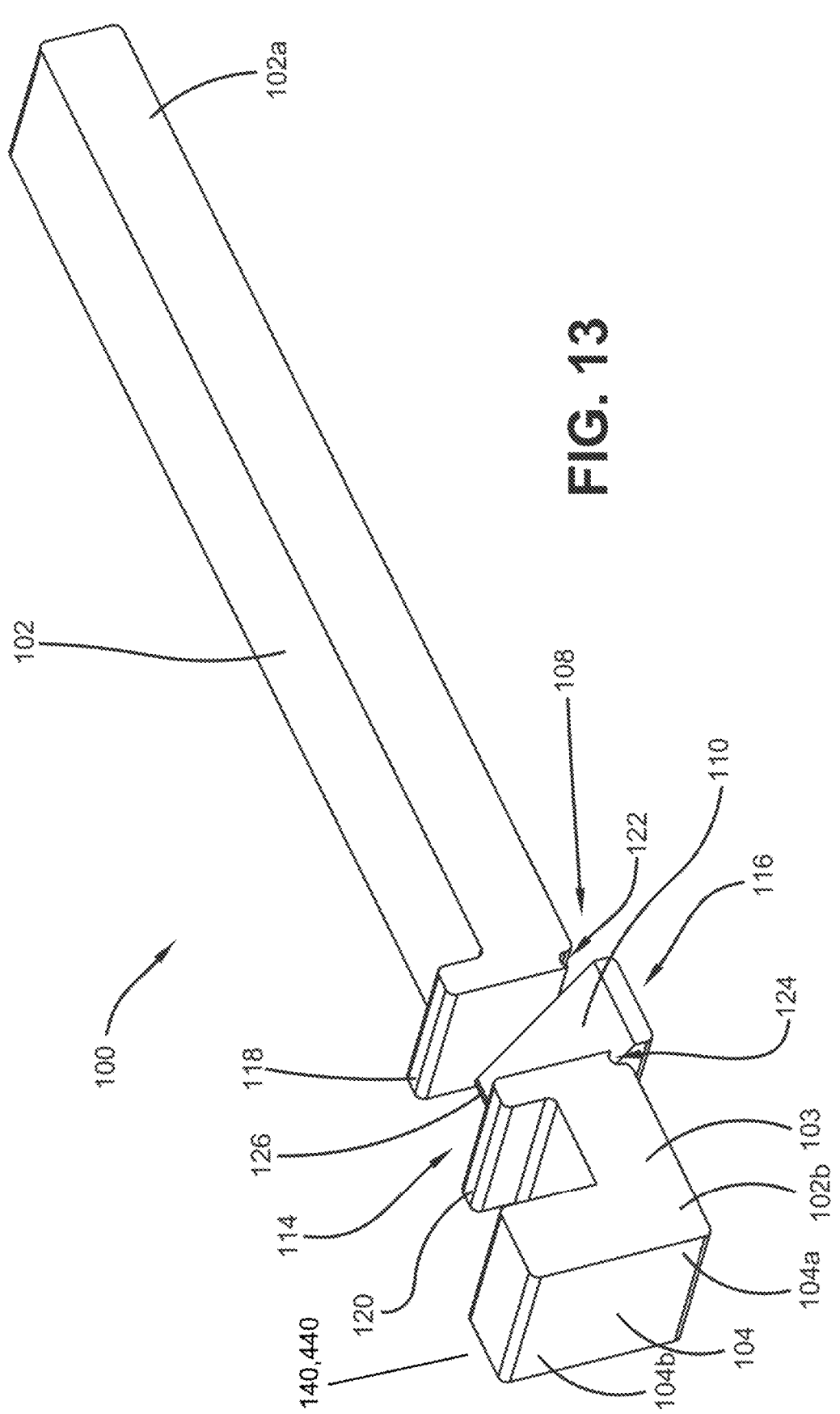
FIG. 13 is a perspective view of another implementation of a tool.
Figure 14:
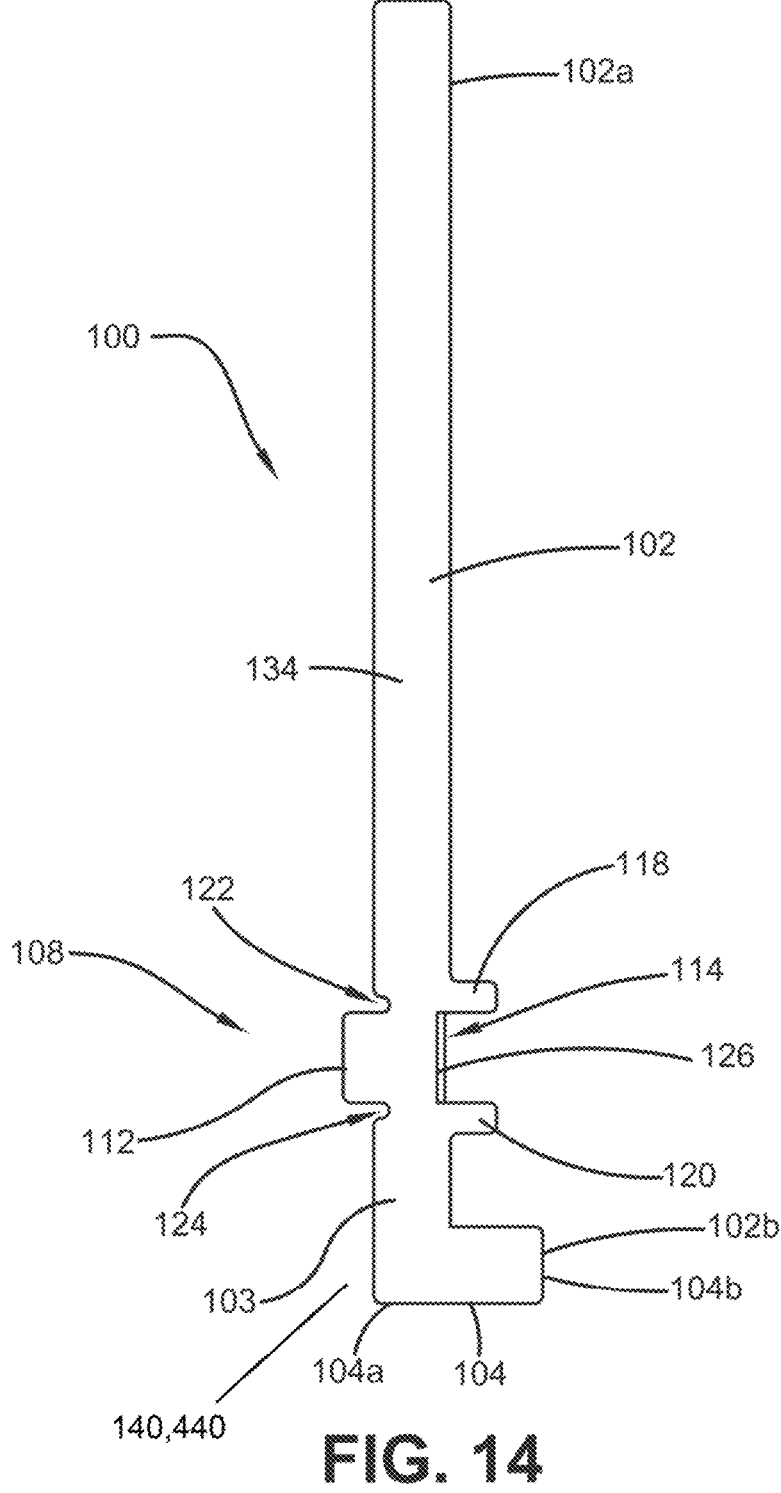
FIG. 14 is a left side view of FIG. 13.
Figure 15:
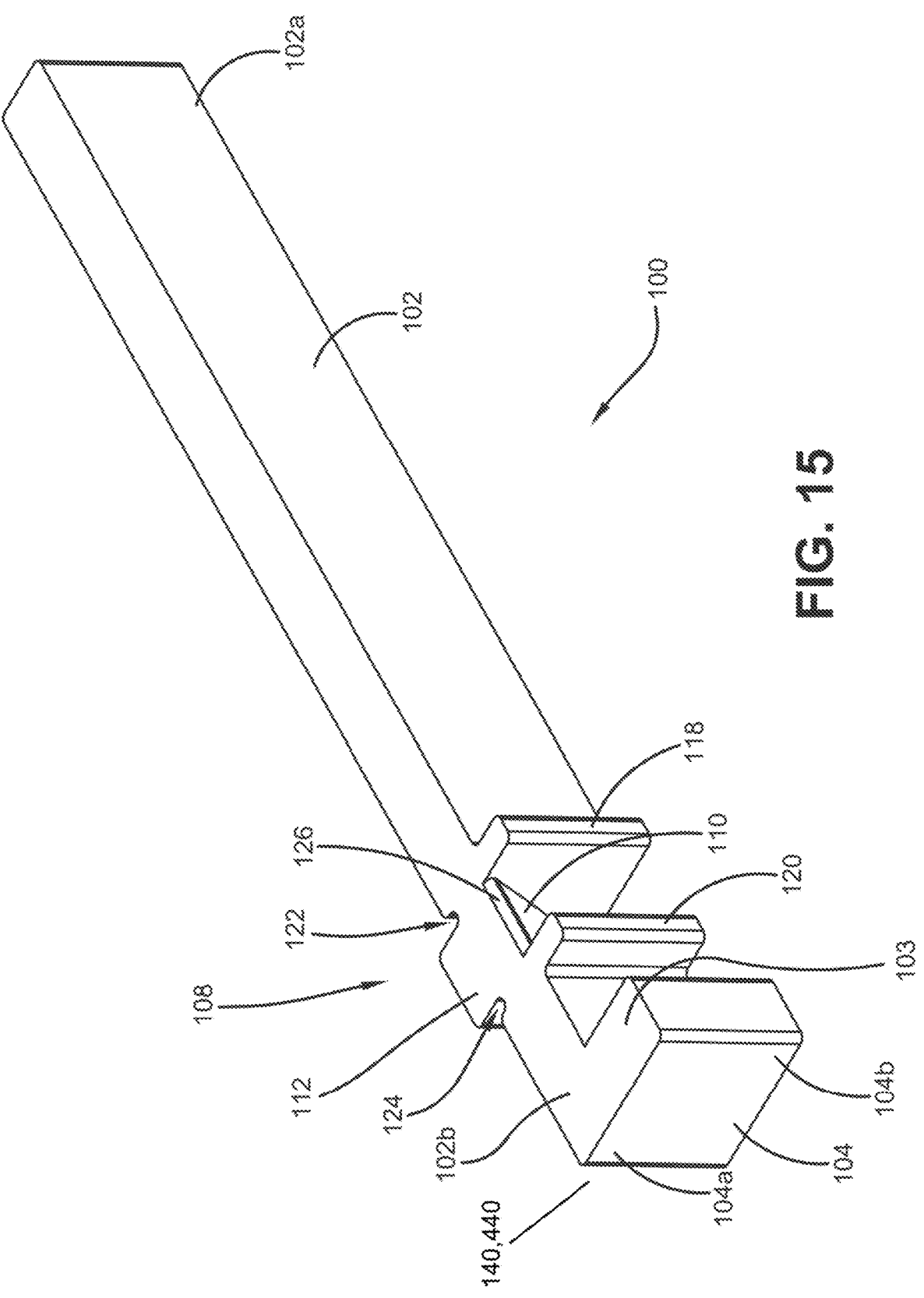
FIG. 15 is an alternative perspective view of FIG. 13.
Figure 16:
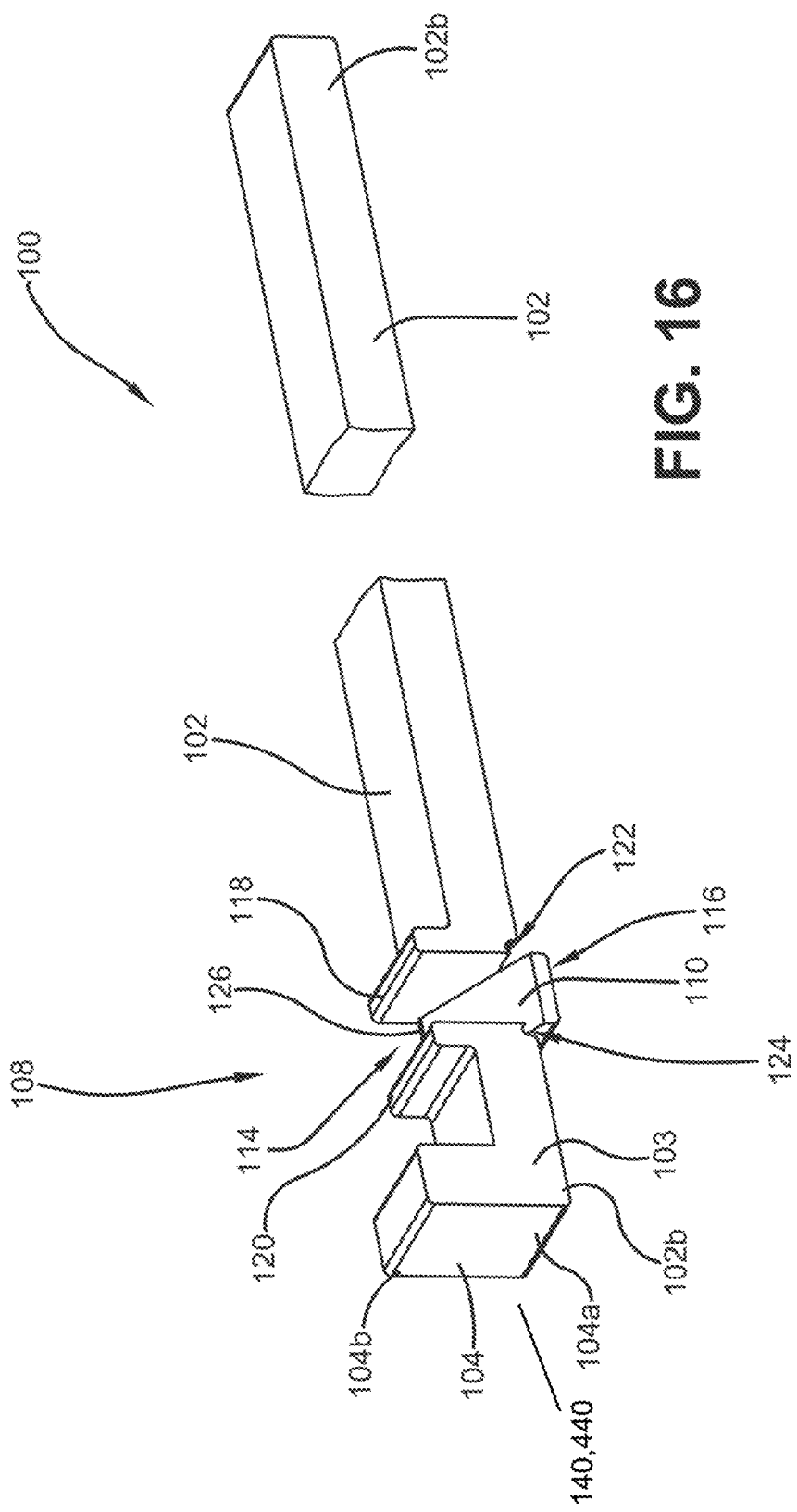
FIG. 16 is a perspective view of another implementation of a tool.

In yet another implementation, the insertion tool 100 may comprise a first segment 102 and a second segment 104. As shown in FIGS. 13-16, for example, the second segment may be shortened in length. As shown in FIGS. 13-15, such an implementation may be one unitary piece. As shown in FIG. 16, such an implementation may be two or more pieces. In another implementation, an insertion tool 100 comprising a first segment 102 and a second segment 104 may be separable at some portion along the length of the first segment 102. In another implementation, an insertion tool 100 comprising a first segment 102 and a second segment 104 may be separable at some point in the seal lifting portion 108 or at a location of the surface 110 and one of the guides 118,120.

Figure 17:
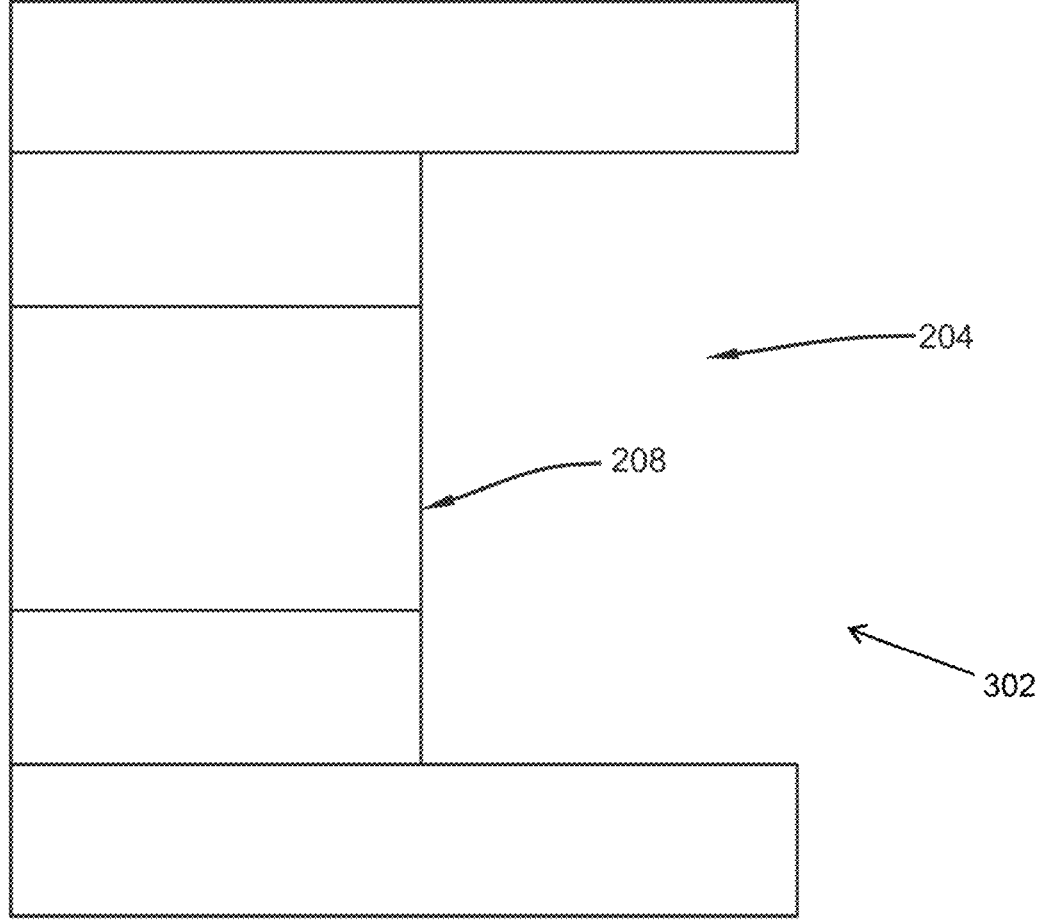
FIG. 17 is a partially graphical view showing an example of a groove for the placement of an implemented electrostatic chuck seal.
Figure 18:
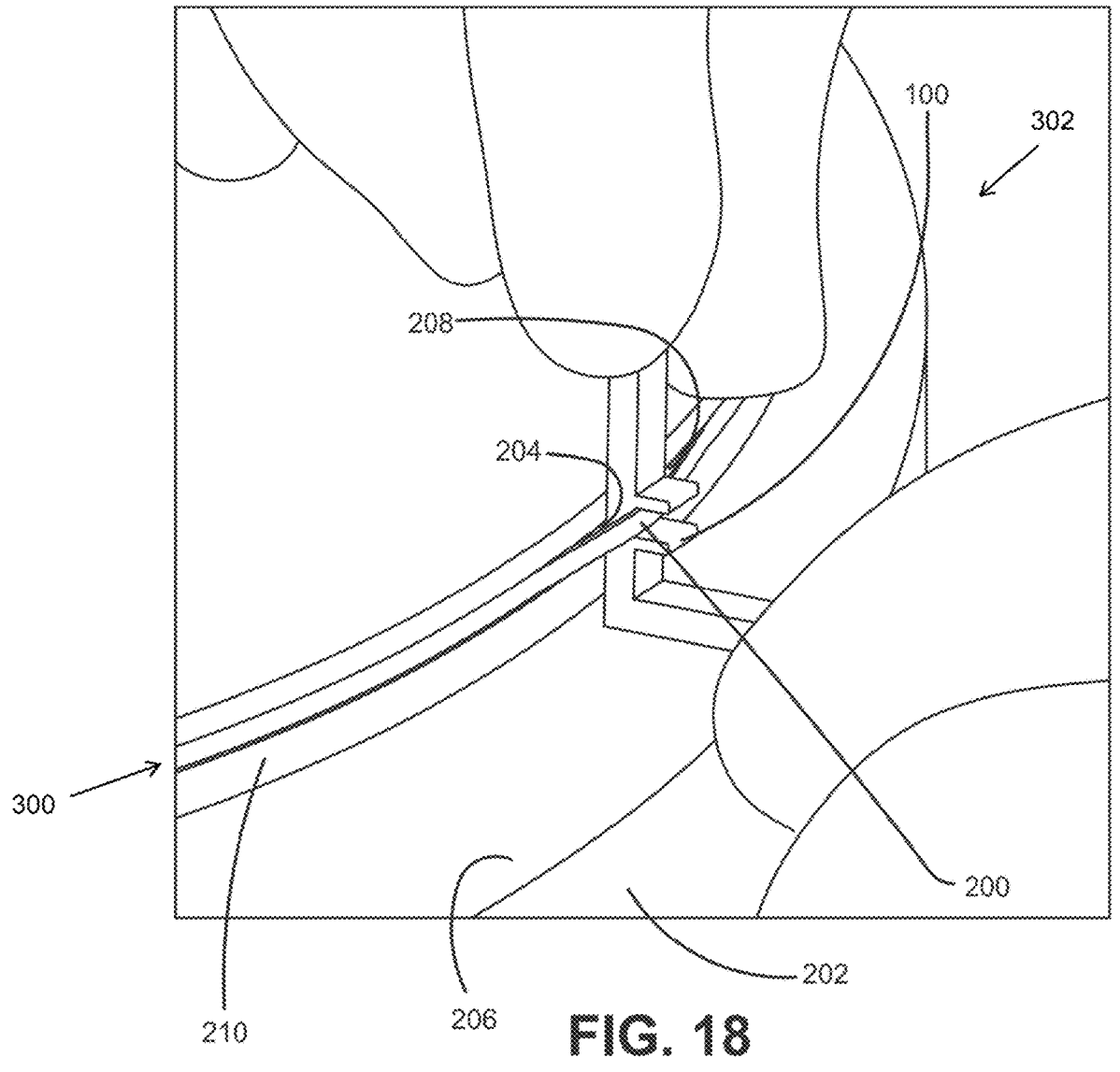
FIG. 18 demonstrates other implementations of a tool.
Figure 19:
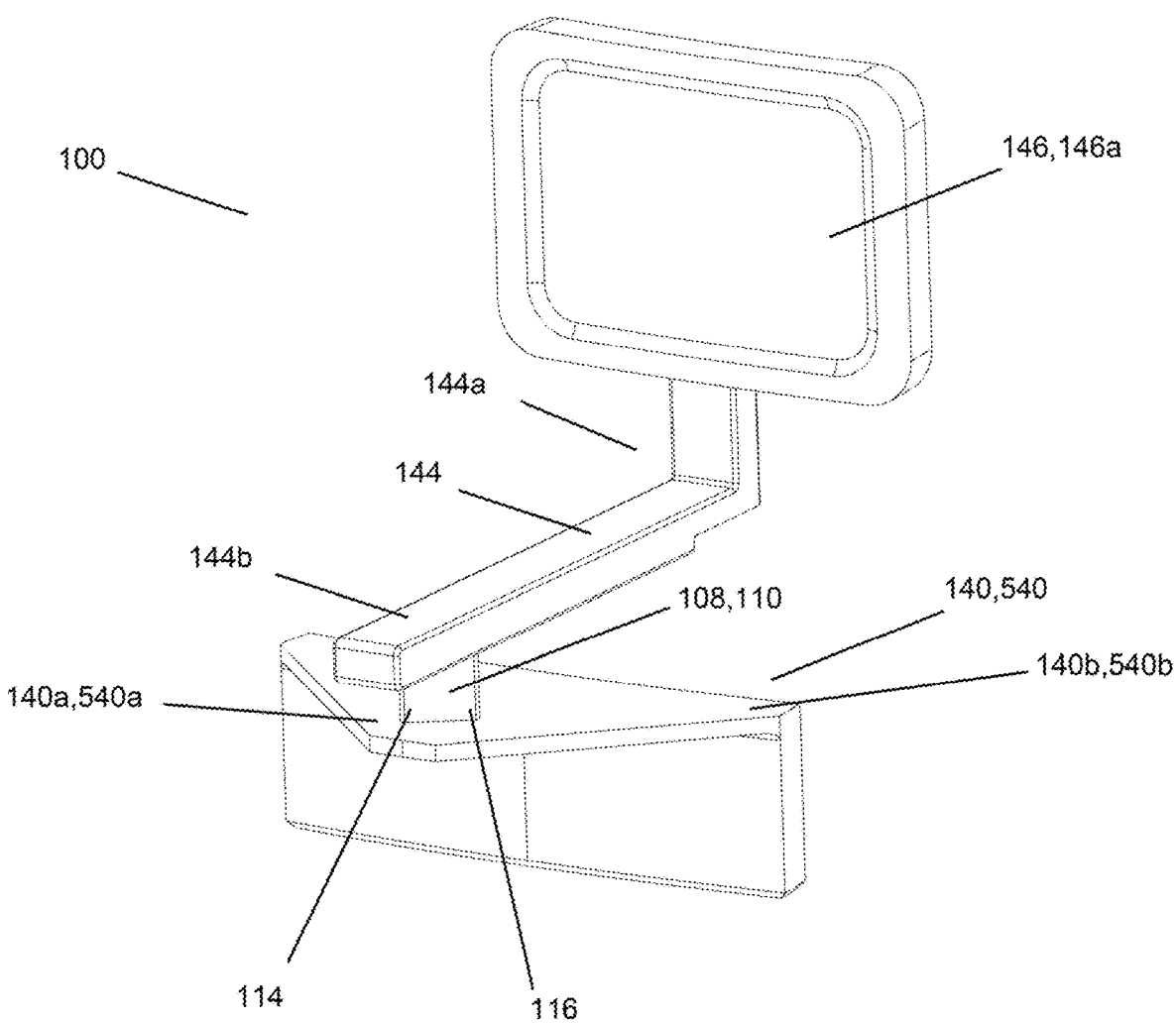
FIG. 19 is a perspective view of another implementation of a tool.
Figure 20:
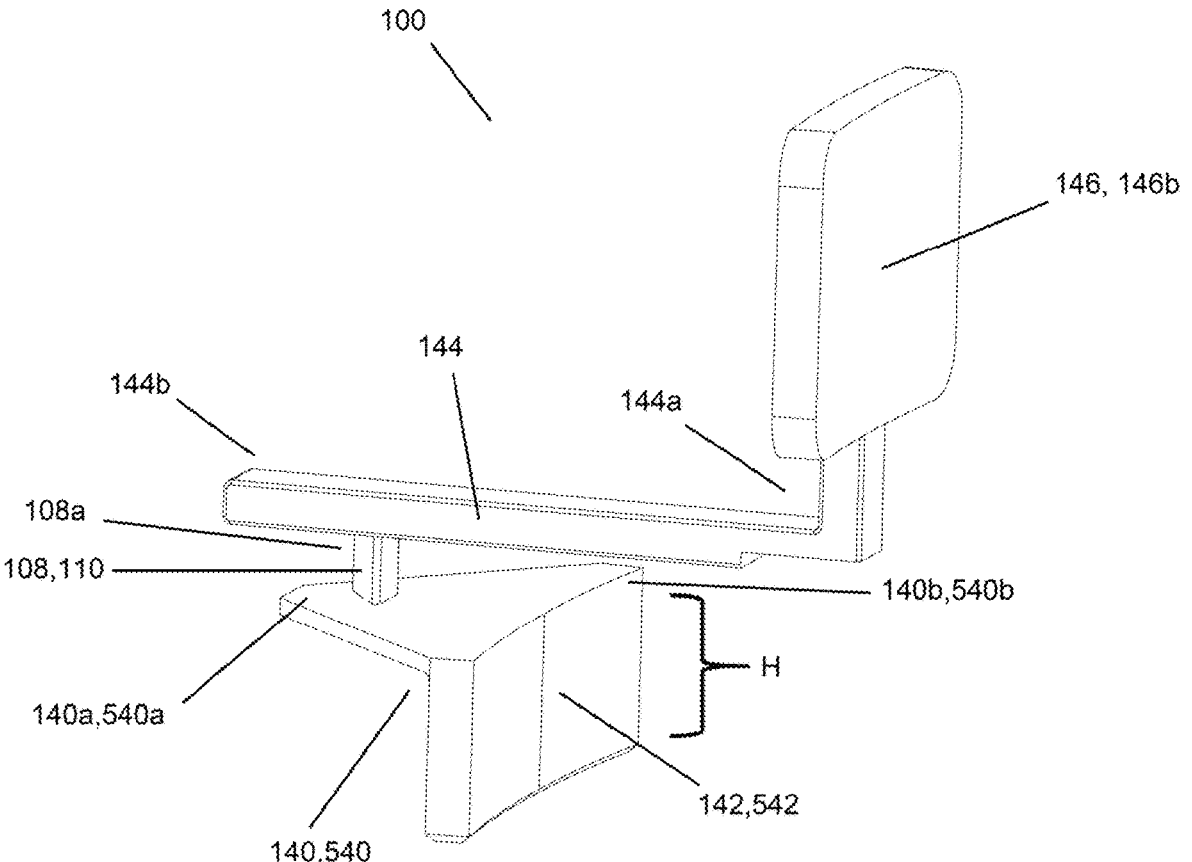
FIG. 20 is another perspective view of FIG. 19.
Figure 21:
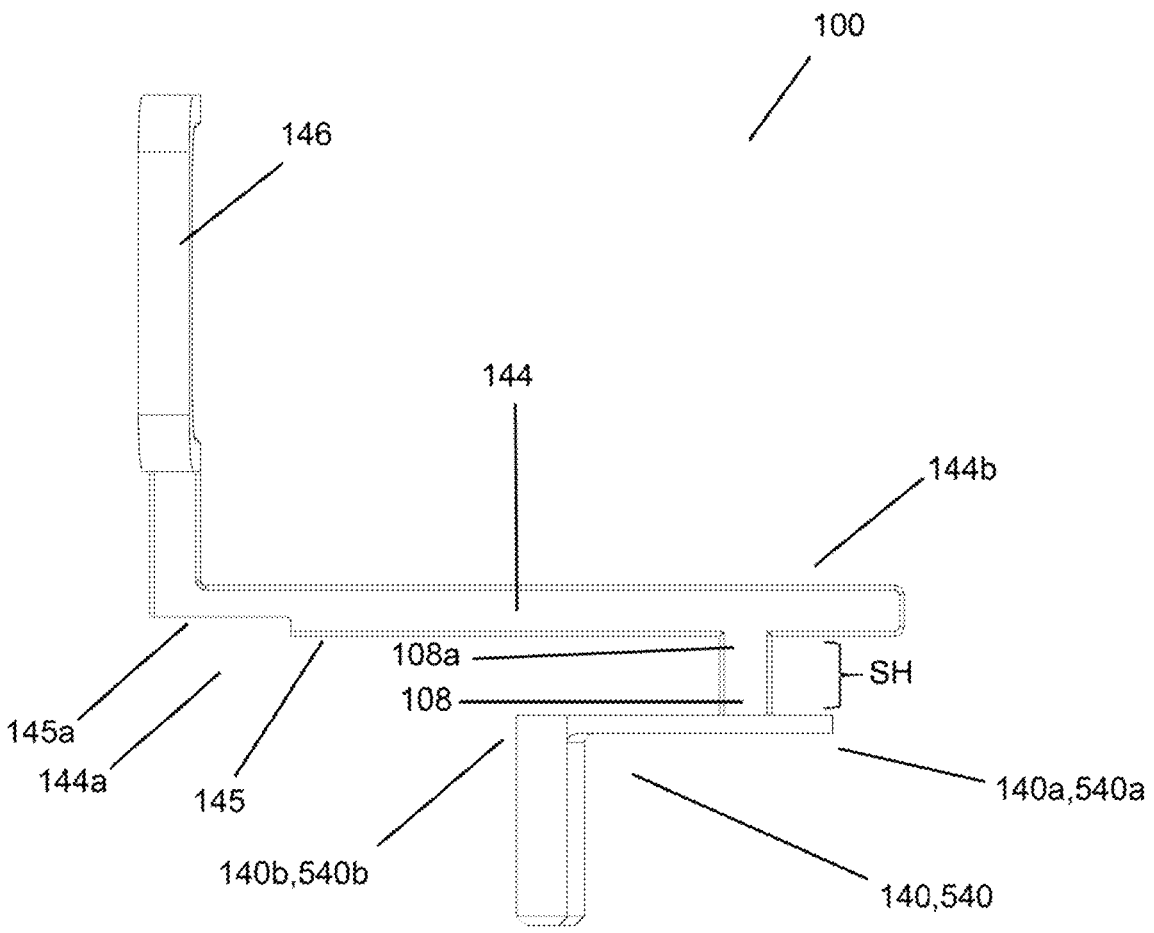
FIG. 21 is a left side view of FIG. 19.
Figure 22:
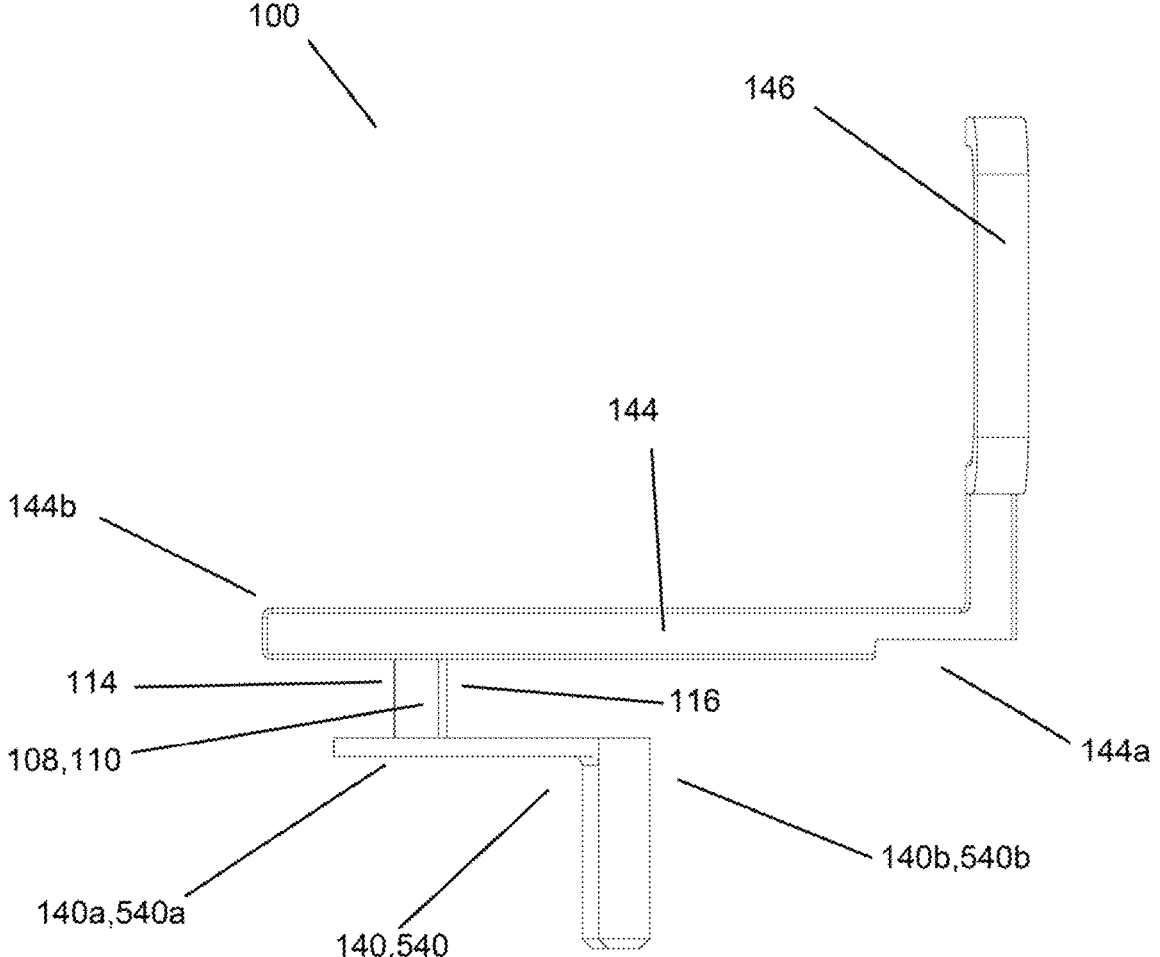
FIG. 22 is a right side view of FIG. 19.
Figure 23:
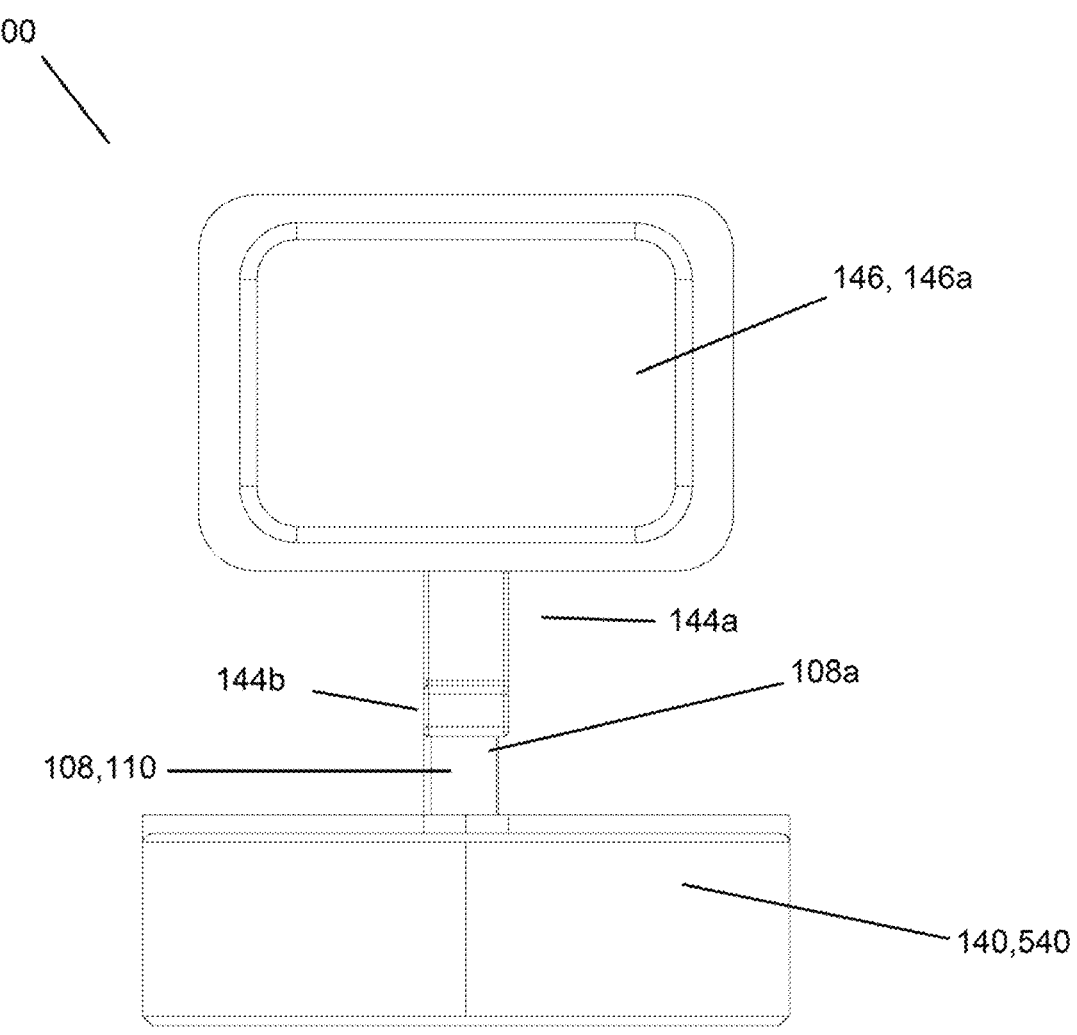
FIG. 23 is a front view of FIG. 19.
Figure 24:
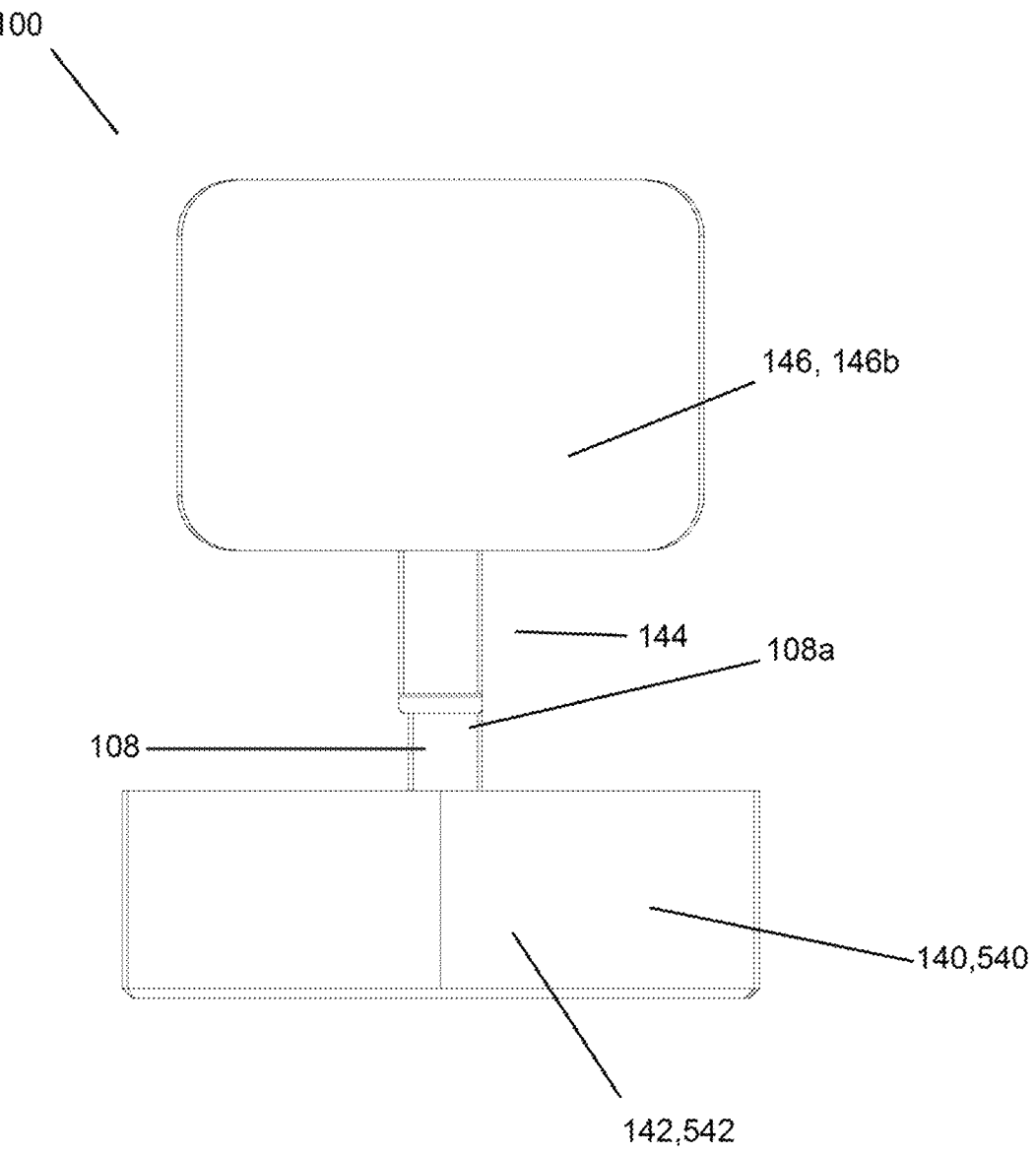
FIG. 24 is a back view of FIG. 19.
Figure 25:
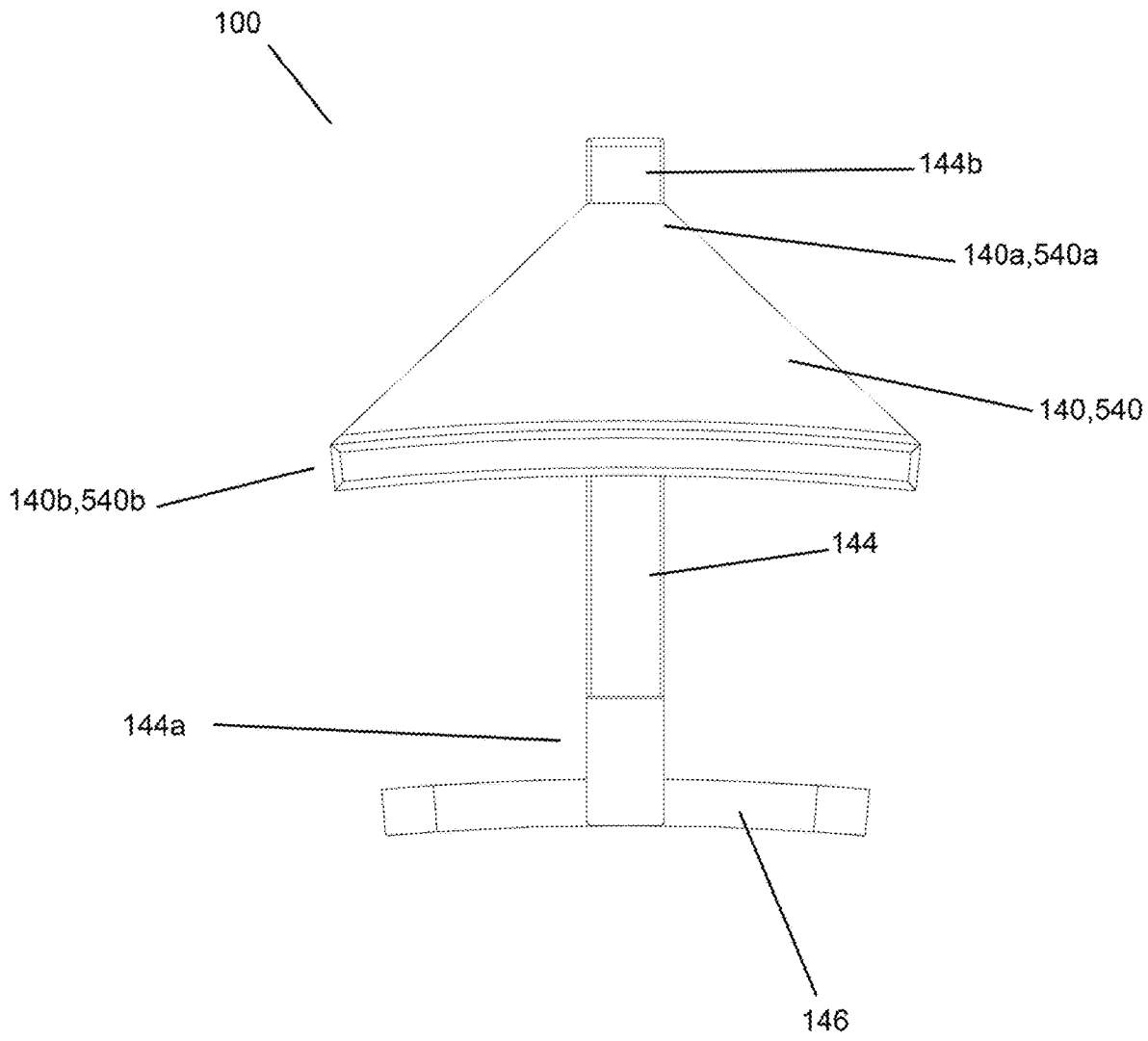
FIG. 25 is a bottom view of FIG. 19.
Figure 26:
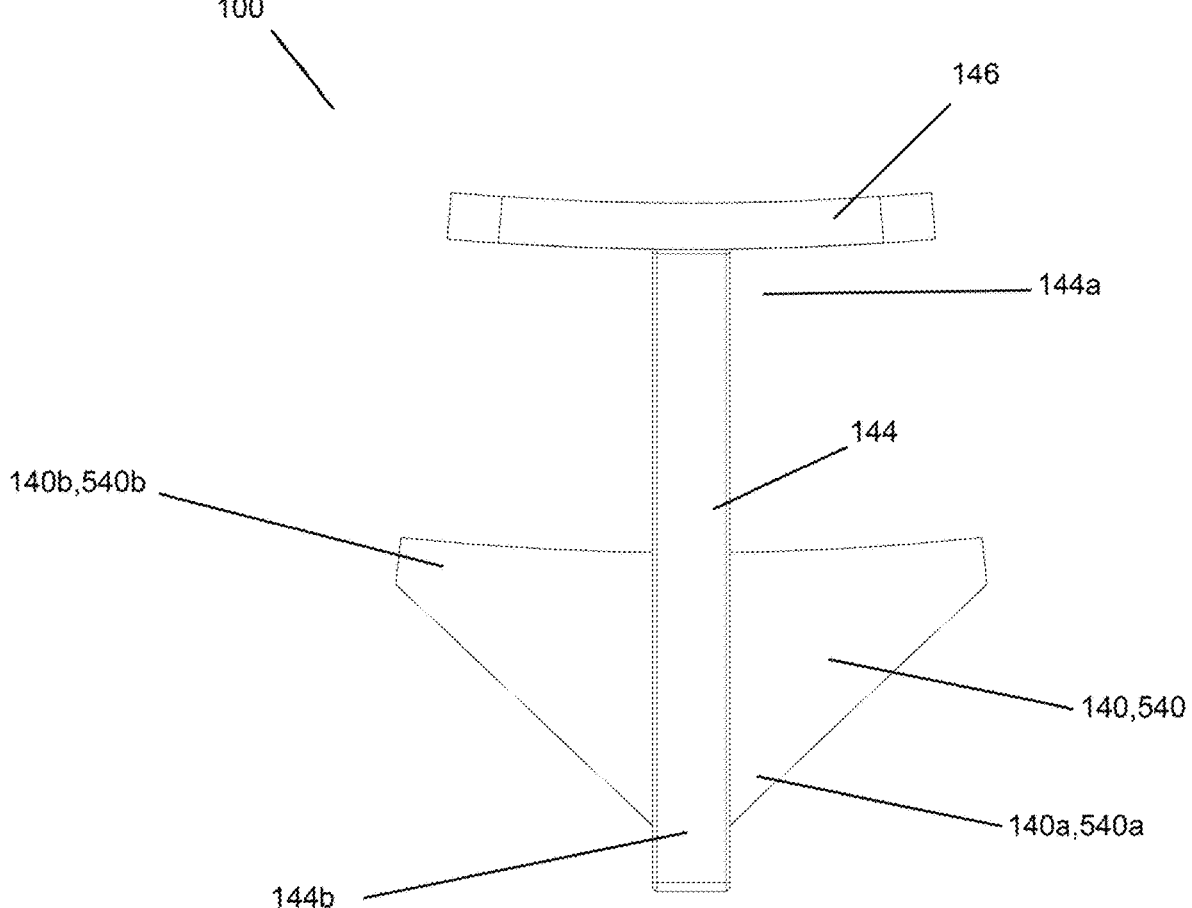
FIG. 26 is a top view of FIG. 19.
Figure 27:
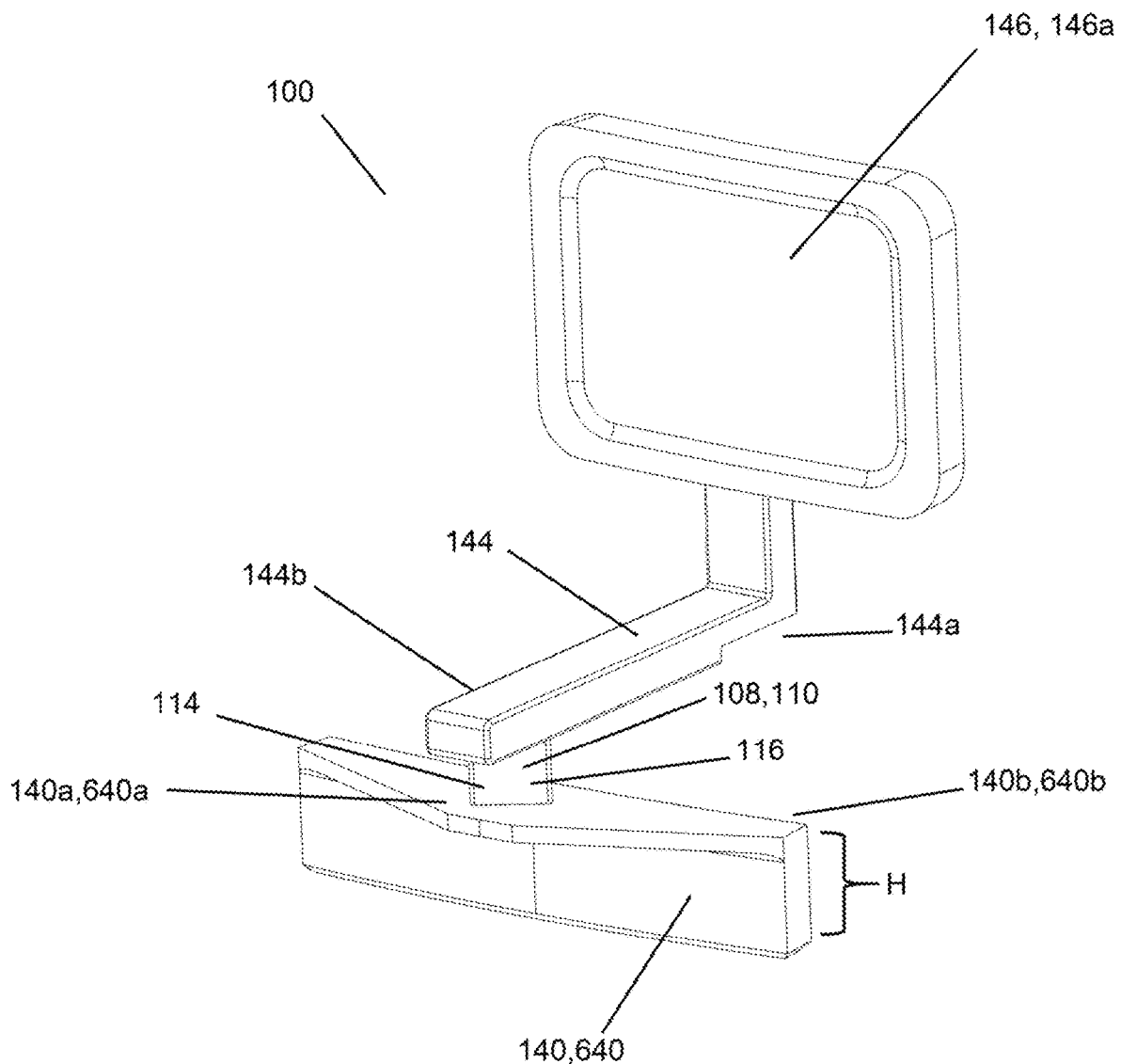
FIG. 27 is a perspective view of another implementation of a tool.
Figure 28:
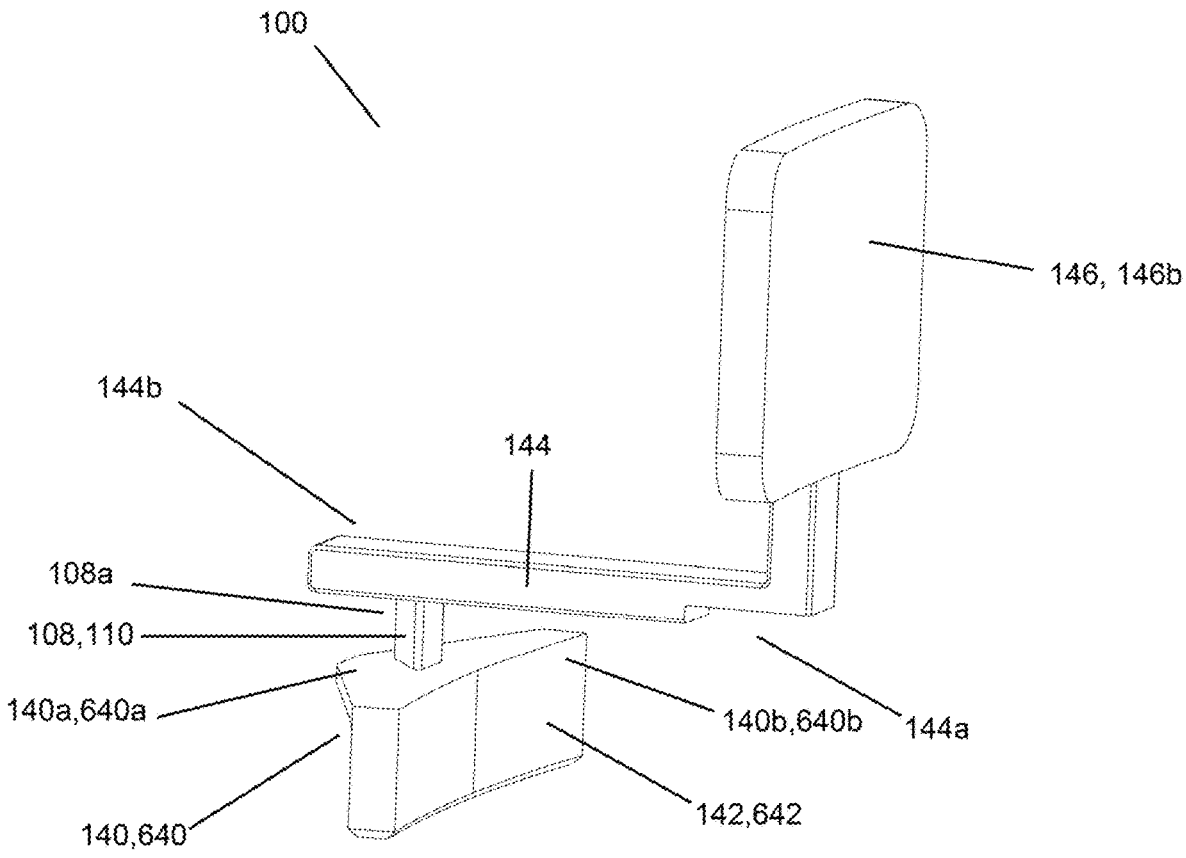
FIG. 28 is another perspective view of FIG. 27.
Figure 29:
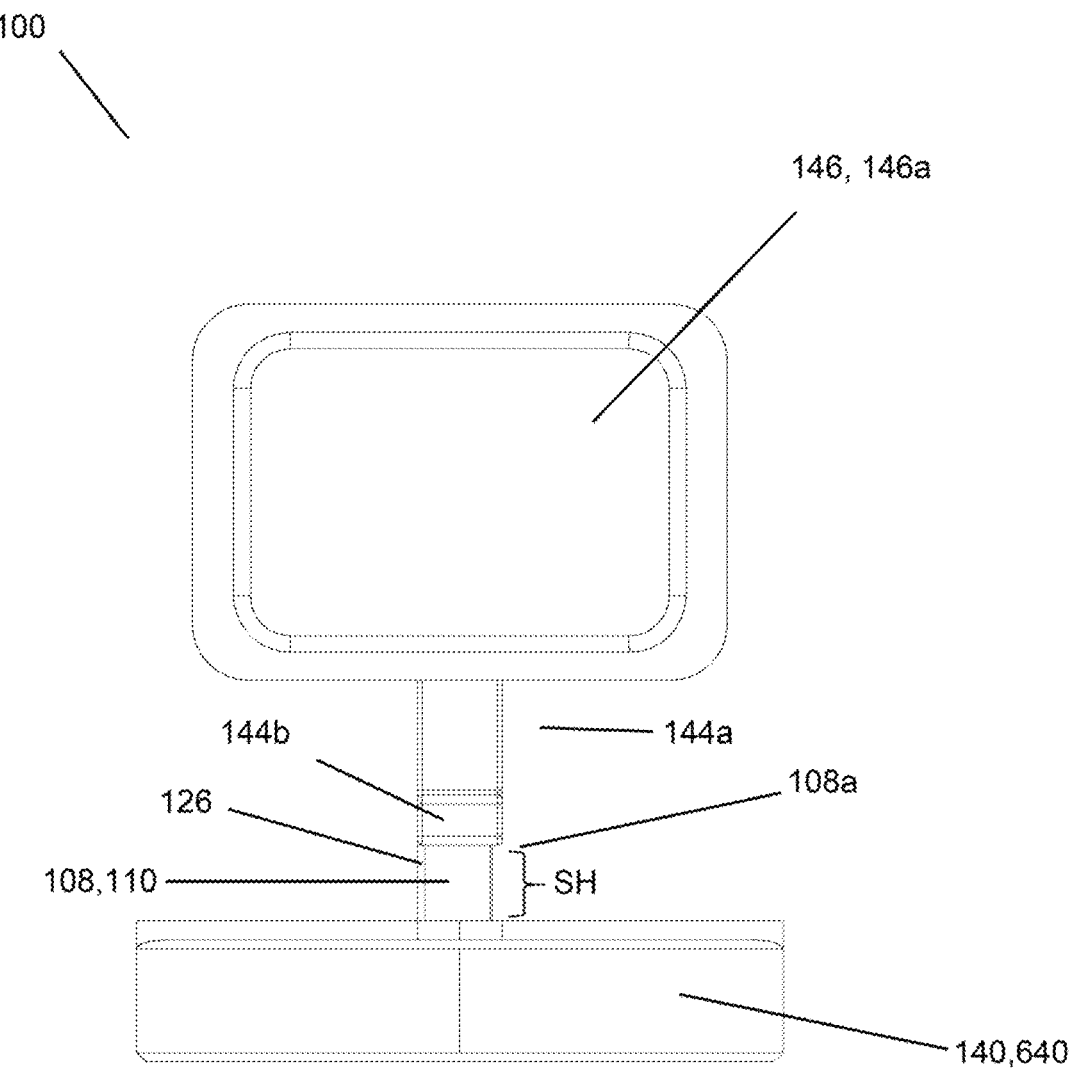
FIG. 29 is front view of FIG. 27.
Figure 30:
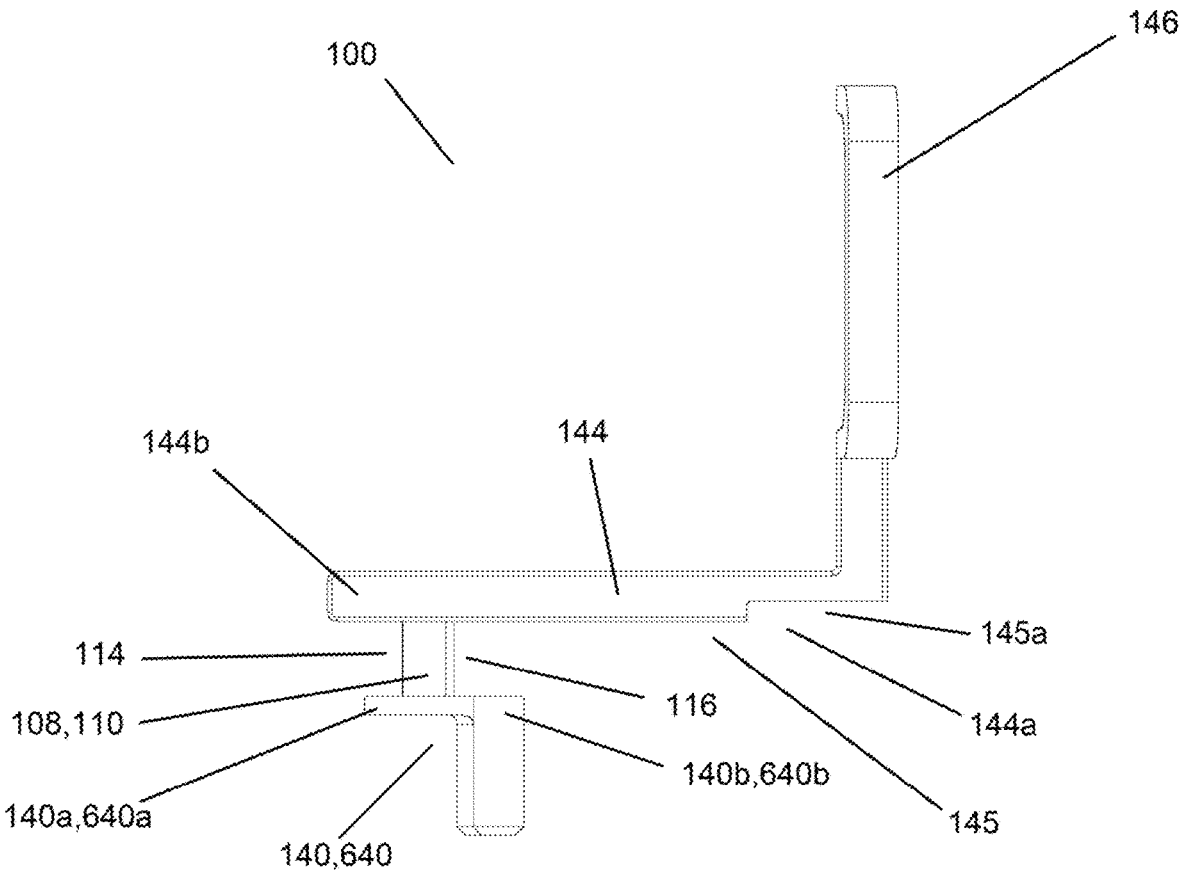
FIG. 30 is a right side view of FIG. 27.
Figure 31:
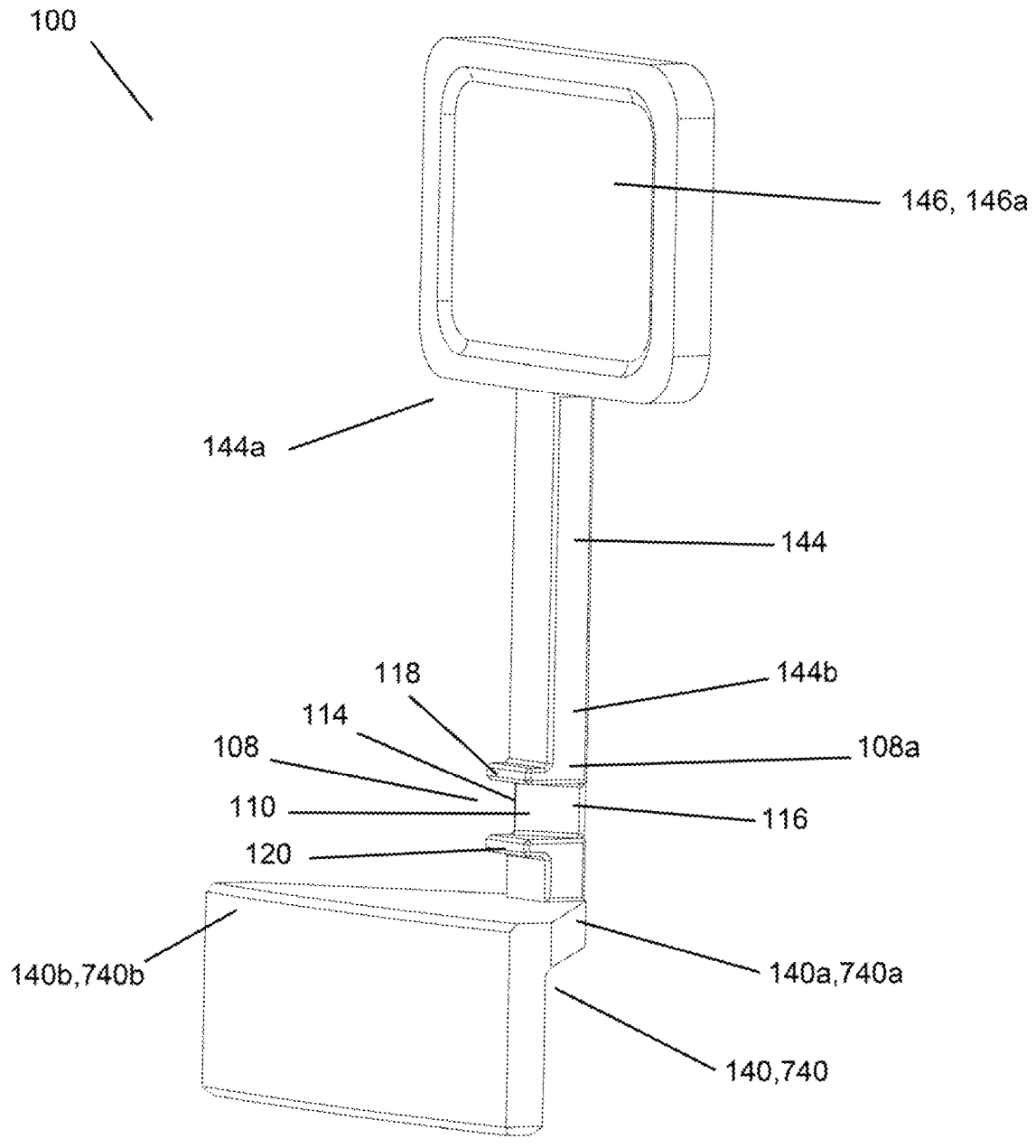
FIG. 31 is a perspective view of another implementation of a tool.
Figure 32:
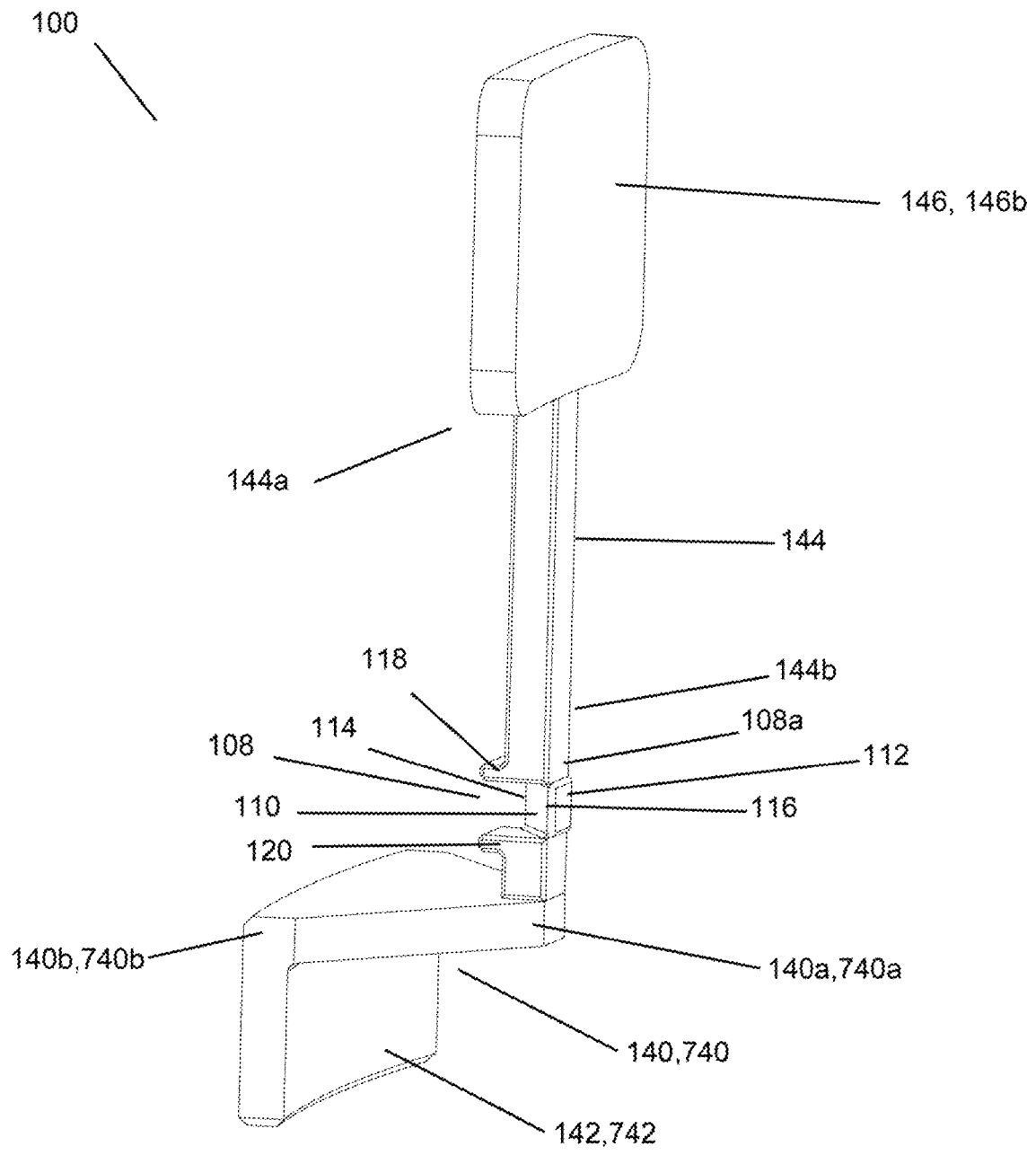
FIG. 32 is another perspective view of FIG. 31.
Figure 33:
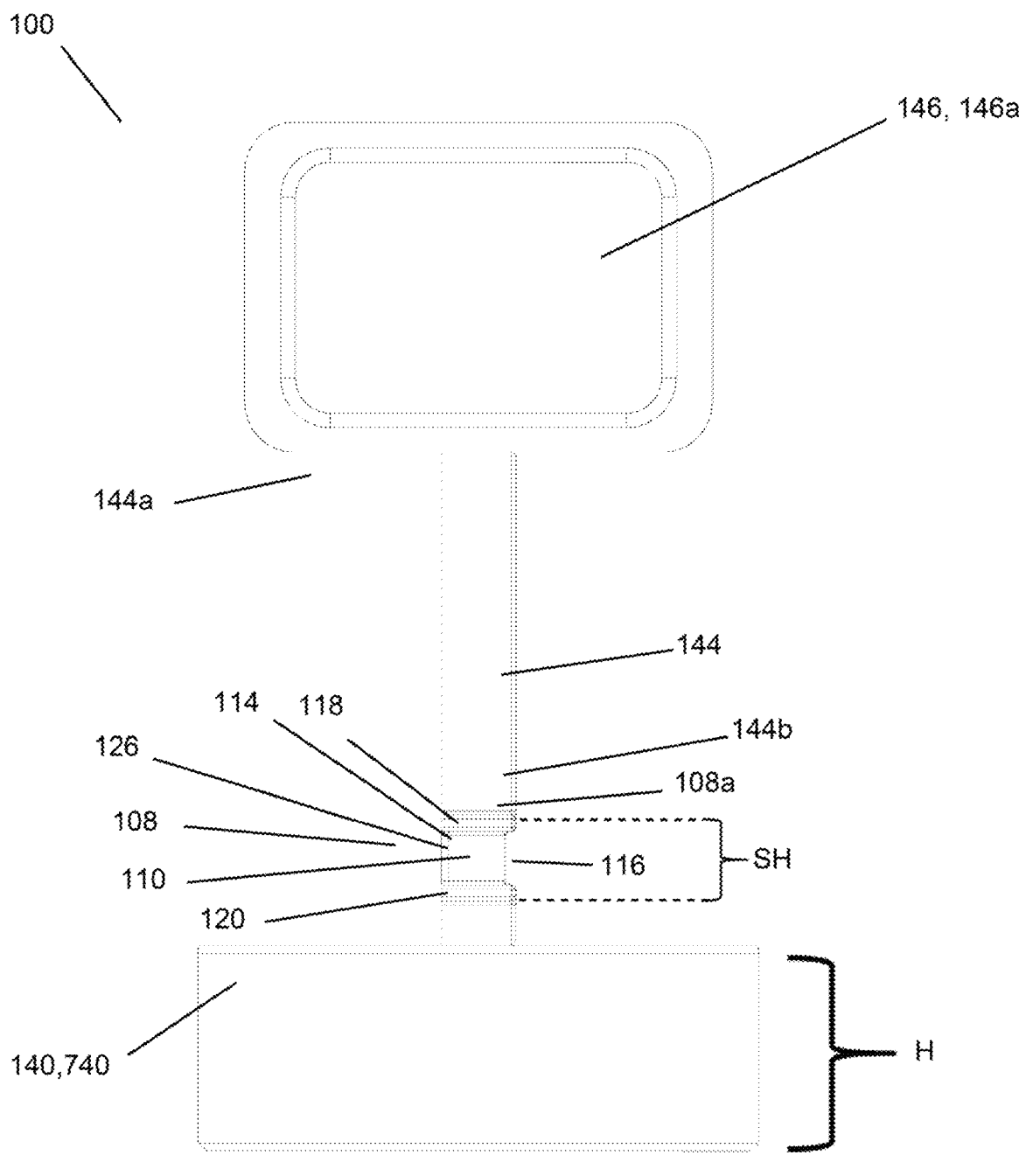
FIG. 33 is a front view of FIG. 31.
Figure 34:
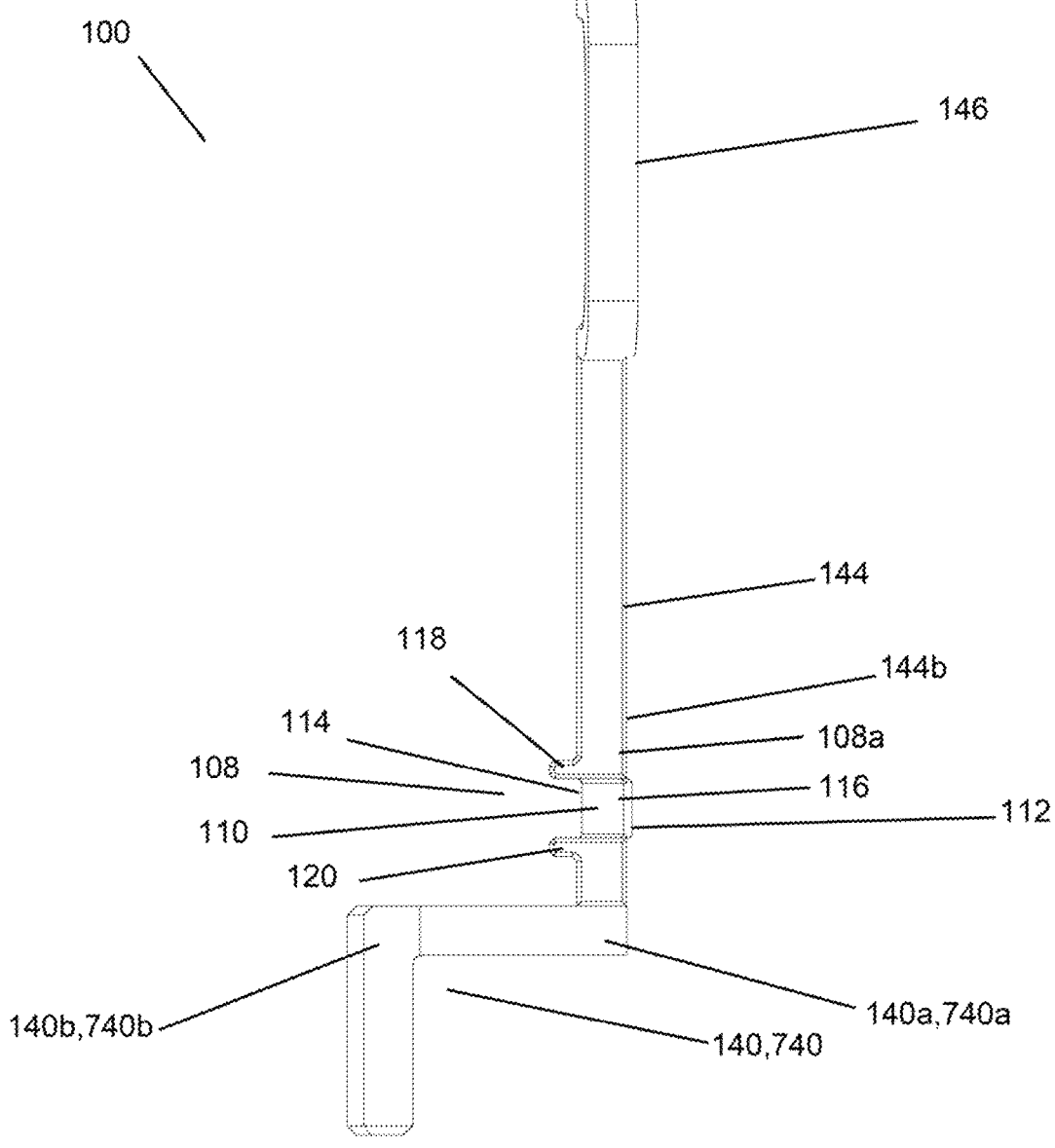
FIG. 34 is a right side view of FIG. 31.
Figures 35A, 35B, 35C, 35D:
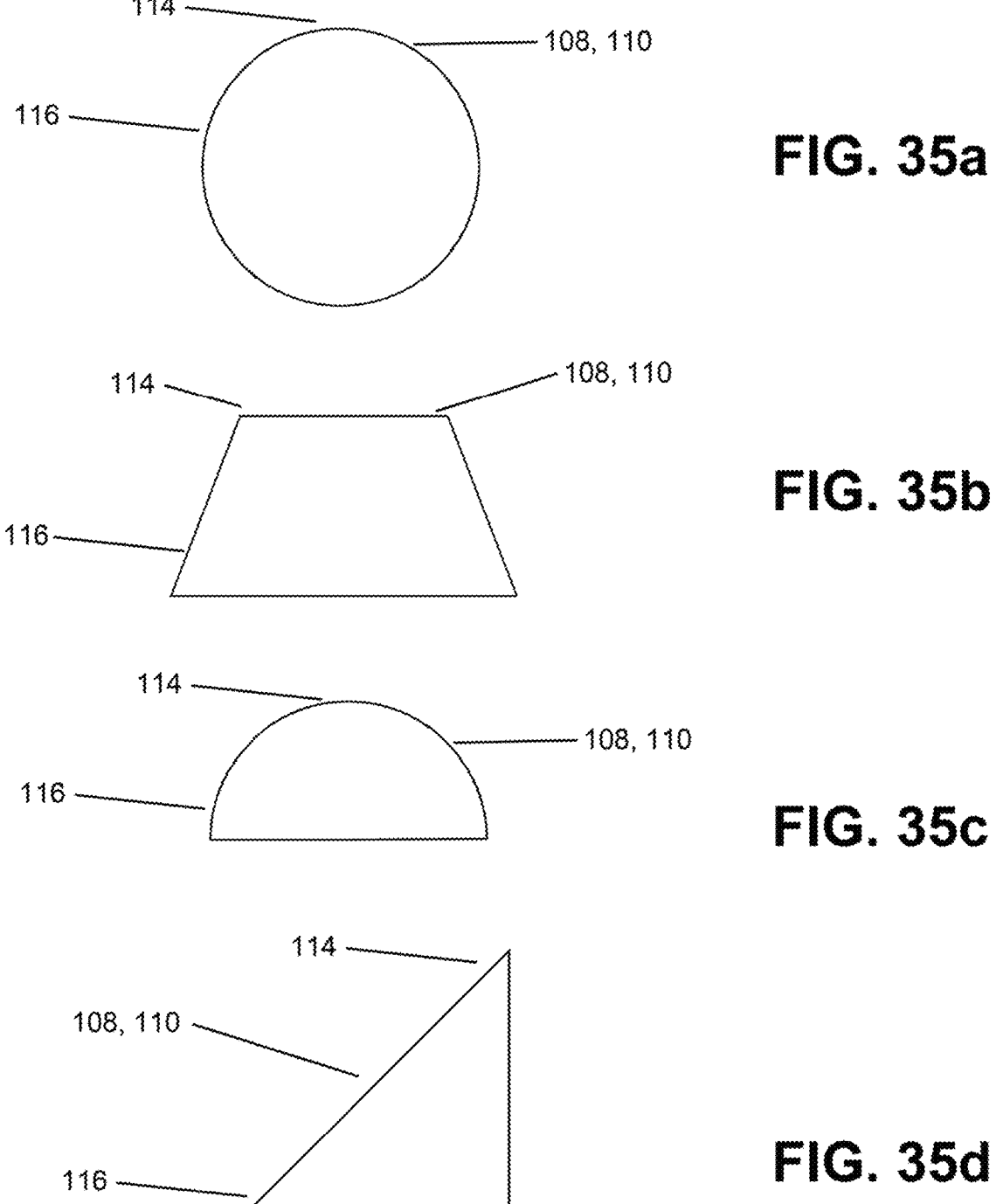
FIG. 35a is a top view of a cross section of one implementation of the seal lifting portion of a tool.
FIG. 35b is a top view of a cross section of another implementation of the seal lifting portion of a tool.
FIG. 35c is a top view of a cross section of another implementation of the seal lifting portion of a tool.
FIG. 35d is a top view of a cross section of another implementation of the seal lifting portion of a tool.

In one implementation, as shown in FIG. 17, the rear surface 208 of the electrostatic chuck 202 may be planar. In this implementation, the electrostatic seal 200 may directly contact the rear surface 208 of the groove 204 once positioned with the insertion tool 100.

In order to utilize the insertion tool 100 and position an electrostatic seal 200 into the groove 204 of an electrostatic chuck 202, the insertion tool 100 as described herein may be provided. The insertion tool 100 is positioned such that the surface 110 has the thicker portion 114 disposed to the left and the thinner portion 116 disposed to the right. The second segment 104 and third segment 106 may mate against a portion of the electrostatic seal 200. The user lifts the electrostatic seal 200 and positions it against the surface 110. The user may support the insertion tool 100 by supporting the first segment 102 with one hand and the third segment 106 with the other hand. The user then moves the insertion tool 100 along the perimeter 210 of the electrostatic chuck 202. In one implementation, the user moves the insertion tool 100 in a clockwise motion about the perimeter 210 of the electrostatic chuck 202. The user may make a plurality of revolutions around the perimeter 210 with the insertion tool 100. In one implementation, the user may make one, two, three, four, five or six revolutions around the electrostatic chuck 202. In another example implementation, the user makes three revolutions around the electrostatic chuck 202. As revolutions are made, the electrostatic seal 200 is lifted as it travels from the thicker portion 114, across the surface 110 towards the thinner portion 116. After being in the lifted position, the electrostatic seal 200 travels across the surface 110, towards the thinner portion 116 and is disposed in the groove 204 to the unlifted position. As revolutions are made with the insertion tool 100, the internal stresses of the elastomer in the electrostatic seal 200 are relieved.

In yet another implementation, as shown in FIGS. 19-34, the insertion tool 100 may further comprise an arm 144 comprising a first end 144a and a second end 144b. The arm 144 may be operably connected to a first end 108a of the seal lifting portion 108 proximate the second end 144b of the arm 144. As shown in FIGS. 19-30, the seal lifting portion 108 may be situated between the base 140,540,640 and the arm 144 such that the base 140,540,640 and the arm 144 are configured to maintain placement of the seal 300 against at least a portion of the surface 110 of the seal lifting portion 108. By situating the seal 300 between the base 140,540,640 and the arm 144, the seal 300 may be prevented from inadvertently slipping from the surface 110 of the seal lifting portion 108 during use.

In such an implementation where the seal lifting portion 108 is situated between the base 140,540,640 and the arm 144, the seal lifting portion 108 may be a height SH such that the surface 110 may be substantially aligned with the associated groove 304 of the component 302 and that the rear surface 142,542,642 of the base 140,540,640 may be substantially aligned with at least a portion of a bottom portion of the component 302.

In another implementation, as shown in FIGS. 1-18 and 31-34, the seal lifting portion 108 may further comprise guides 118,120 on either side of the surface 110. The guides 118,120 have a thickness greater than the thickness of the thicker portion of the surface 110. The guides 118,120 are configured to maintain placement of the seal 300 against at least a portion of the surface 110 of the seal lifting portion 108.

In another implementation, as shown in FIGS. 19-30, the arm 144 may be an elbow shape, the first end 144a of the arm 144 being perpendicular to the second end 144b. In one implementation, as shown in FIGS. 31-34, the arm 144 may be a linear segment. In yet another implementation, the arm 144 may be circular, rectangular, triangular, arcuate, T-shaped, V-shaped, or some other geometry.

In another implementation, as shown in the FIGURES, the arm 144 may further comprise a support surface 145. At least a portion of the support surface 145 may be positioned to directly contact the component 302. In one implementation, as shown in FIGS. 19-30 and FIGS. 36-37, the support surface 145 of the arm 144 may be a grooved portion 145a of the support surface 145 of the arm 144, a depth and height of the groove being determined with sound engineering judgement to mate against the component 302 and to substantially align the surface 110 of the seal lifting portion 108 with the groove 204 of the component 302.

In yet another implementation, as shown in FIGS. 19-34, the first end 144a of the arm 144 may further comprise a gripping portion 146. In another implementation, as shown in FIGS. 38-42, the second end 140b,840b of the base 140,840, may further comprise a gripping portion 146. The gripping portion 146 may have a surface area sized to provide an operator control of the insertion tool 100. The gripping portion 146 may be rectangular, circular, ovular, triangular, or some other geometry in shape. The surface of the gripping portion 146 may be grooved, have ridges, or be otherwise textured to prevent slipping between the operator and the insertion tool 100 during use.

As shown in FIGS. 19-34, the gripping portion 146 may comprise a first face 146a and a second face 146b, the first face 146a being opposite the second face 146b. In one implementation, the first face may be directed towards the second end 144b of the arm 144 and the second face 146b may be directed towards the component 302. The second face 146b may be curved to provide an operator additional control. In another implementation, the first and second faces 146a,146b may be parallel to the arm 144. In yet another implementation, one of the first or second faces 146a,146b may be directed up and the other of the first or second faces 146a,146b may be directed down.

In order to utilize the insertion tool 100 and position a seal 300 into the groove 304 of a component 302, the insertion tool 100 as described herein may be provided. In one implementation, the insertion tool 100 is positioned such that the surface 110 has the thicker portion 114 disposed to the left and the thinner portion 116 disposed to the right. In another implementation, the surface 110 may be a curved or spherical shape having the thicker portion 114 disposed in the center and the thinner portion 116 disposed at both the right and left sides of the surface 110.

Figure 36:
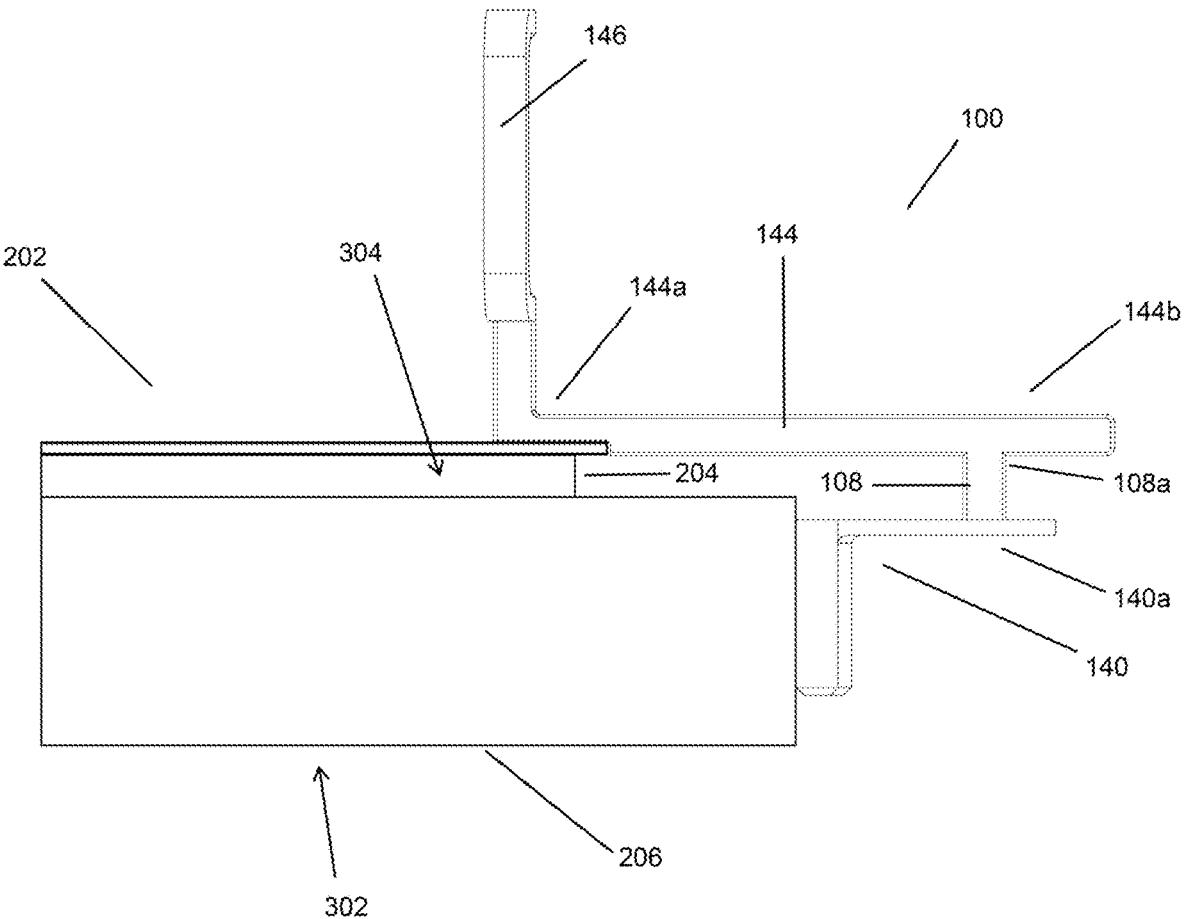
FIG. 36 is a left side view of an implementation of a tool placed in relation to a partially graphical view showing an example of a groove for the placement of an implemented electrostatic chuck seal.
Figure 37:
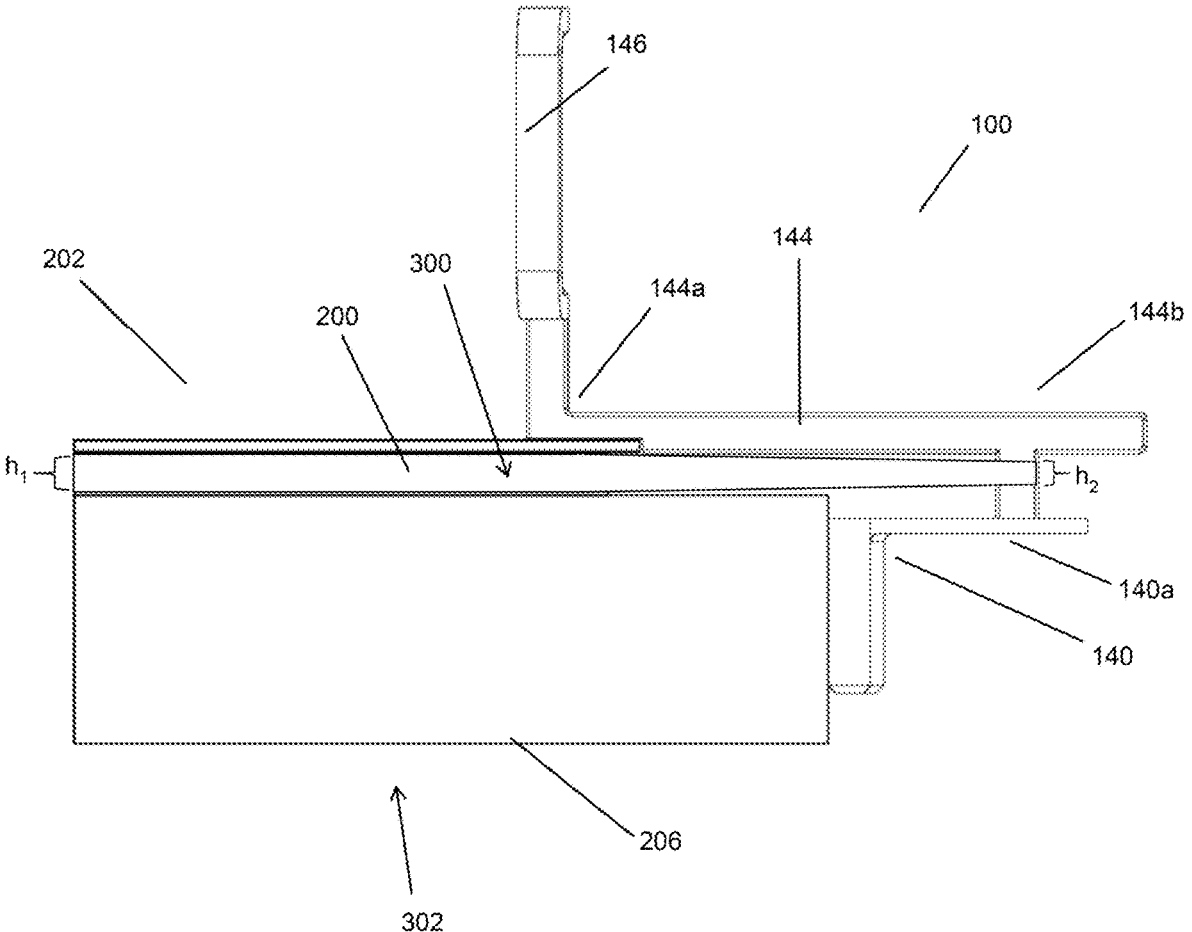
FIG. 37 is a is a left side view of an implementation of a tool placed in relation to a partially graphical view showing an example of the implementation of an electrostatic chuck seal using an implementation of a tool around an electrostatic chuck.
Figure 38:
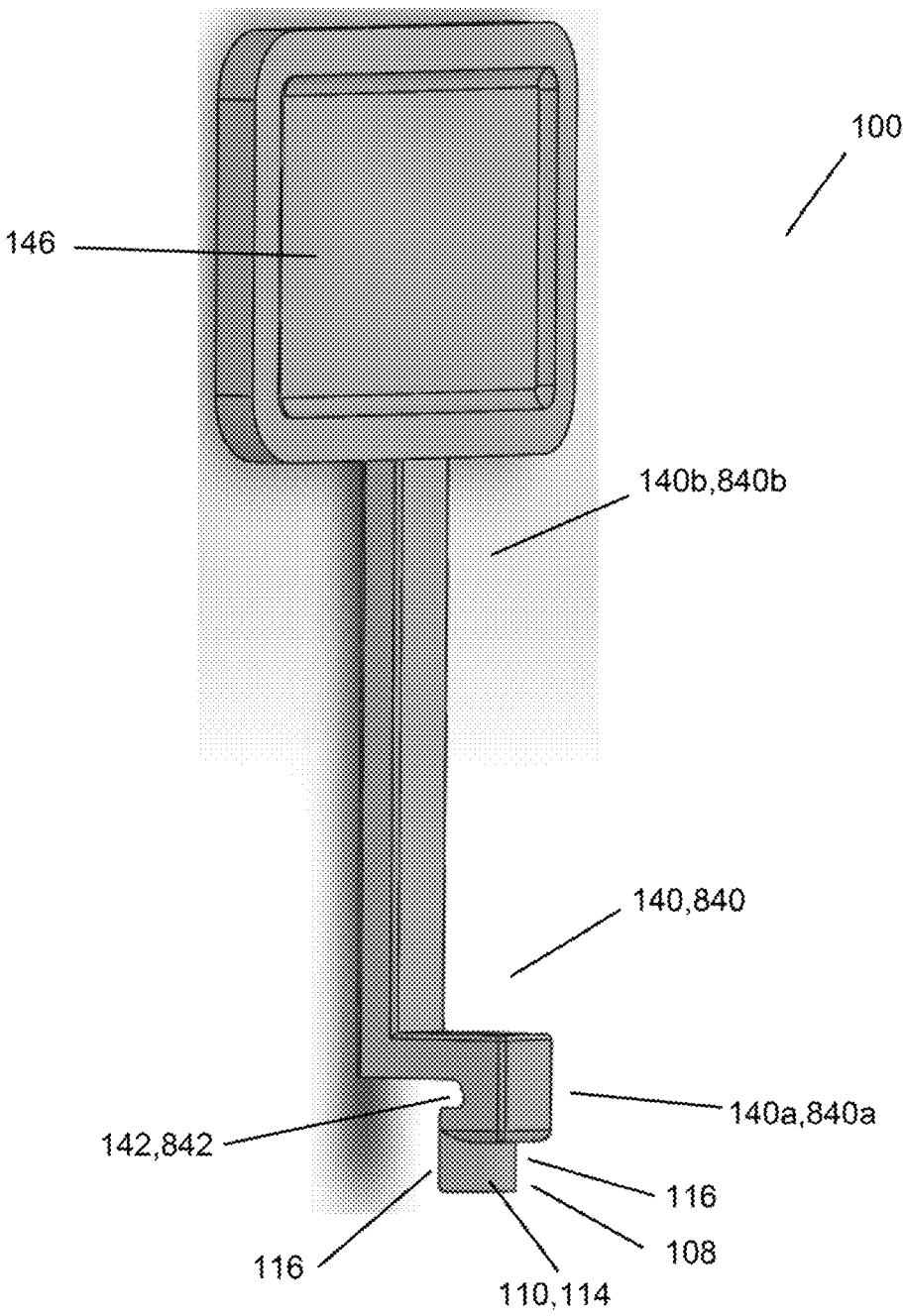
FIG. 38 is an isometric view of another implementation of a tool.
Figure 39:
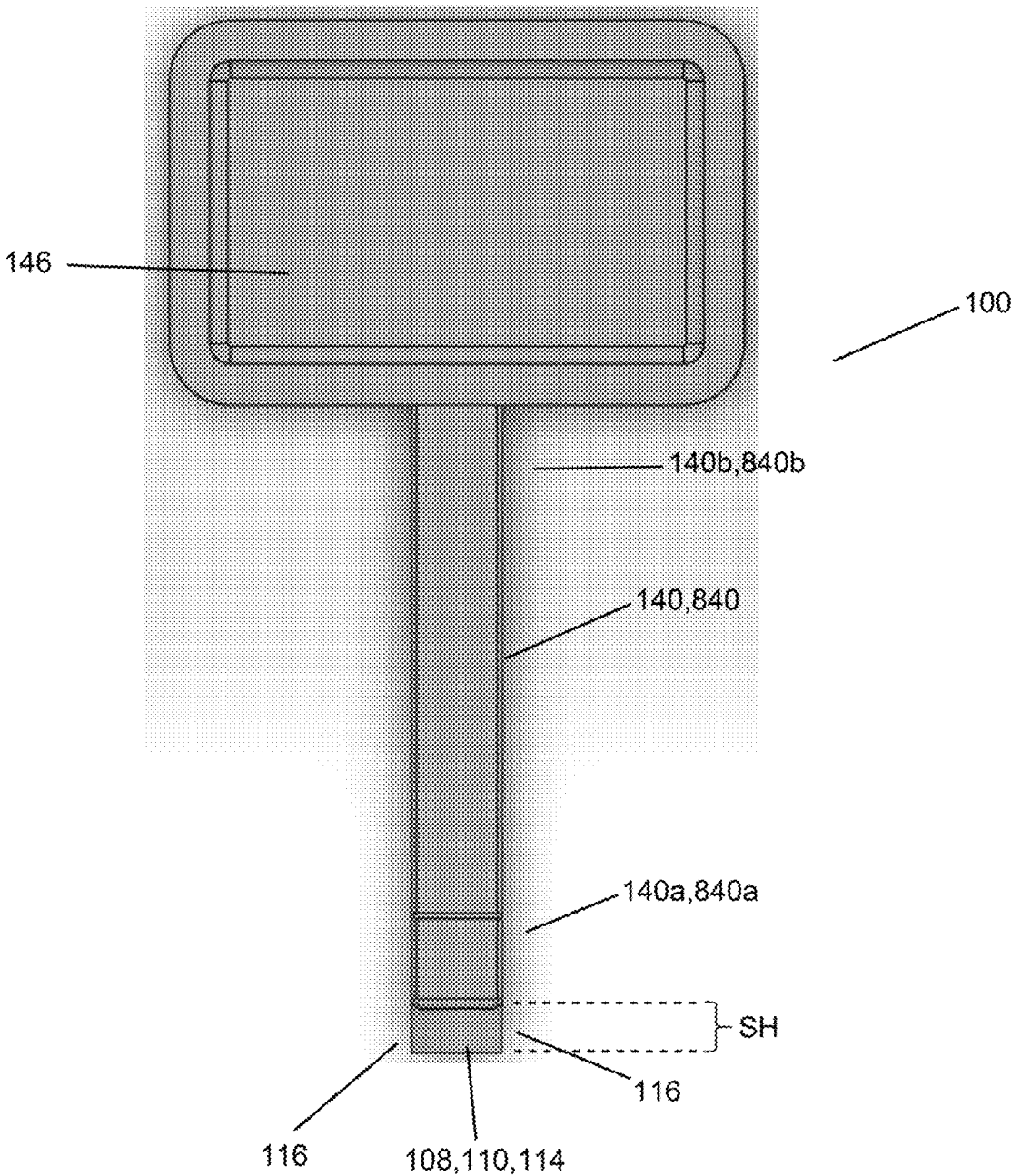
FIG. 39 is a front view of another implementation of a tool.
Figure 40:
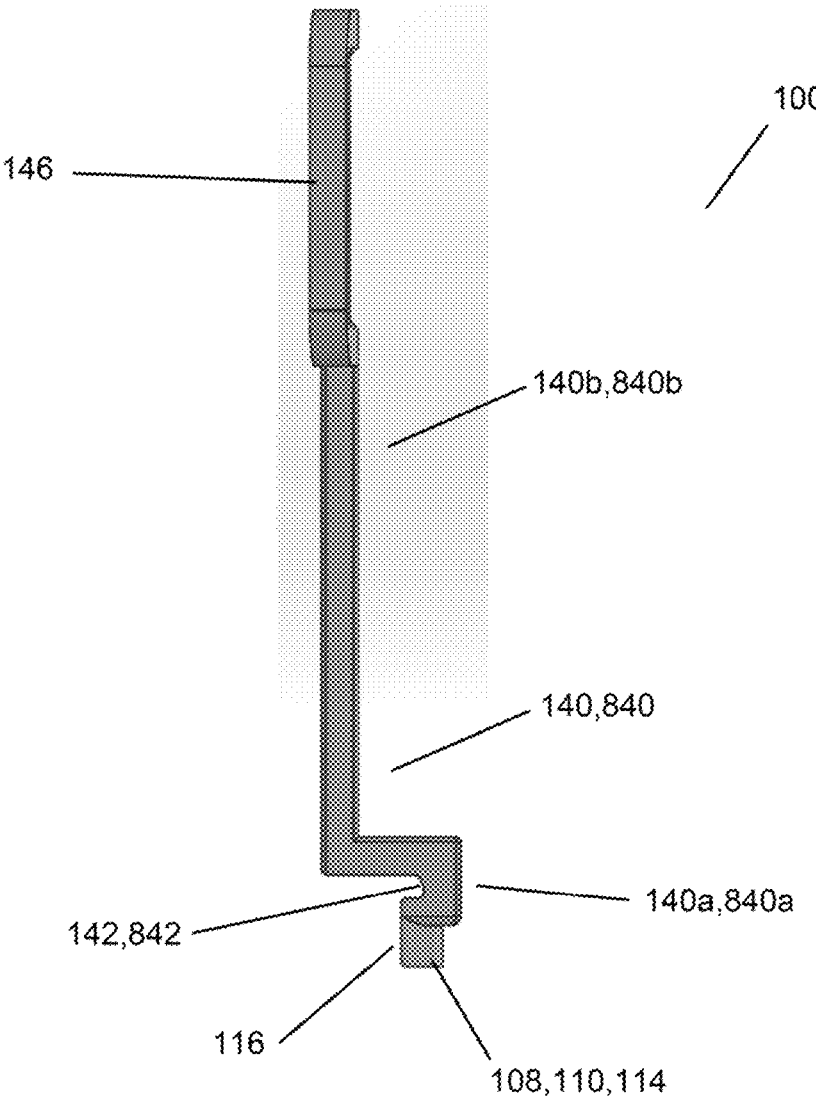
FIG. 40 is a left side view of another implementation of a tool.
Figure 41:
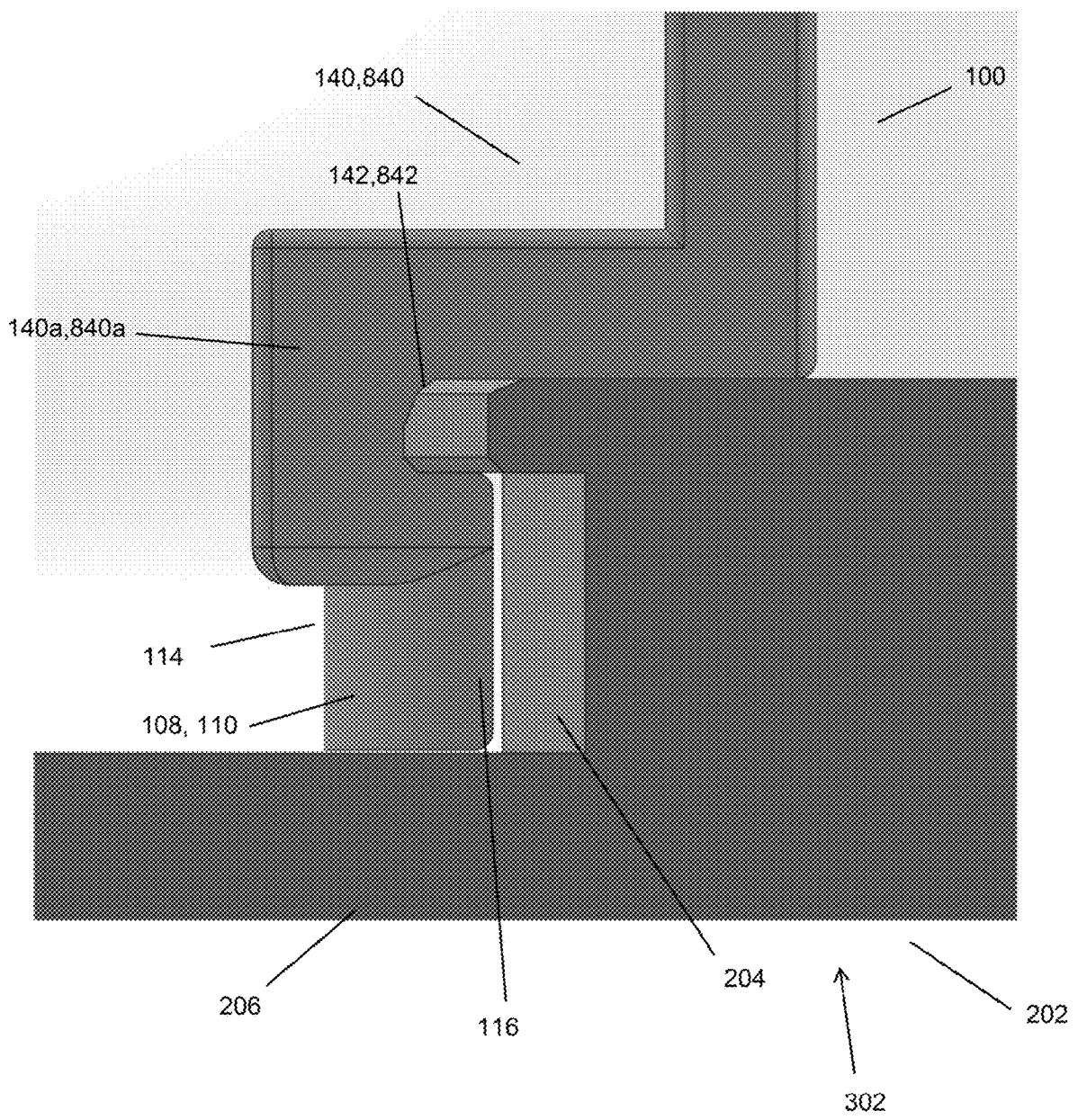
FIG. 41 is a right side view of another implementation of a tool placed in relation to a cross-sectional view showing an example of a groove for the placement of an implemented electrostatic chuck seal.
Figure 42:
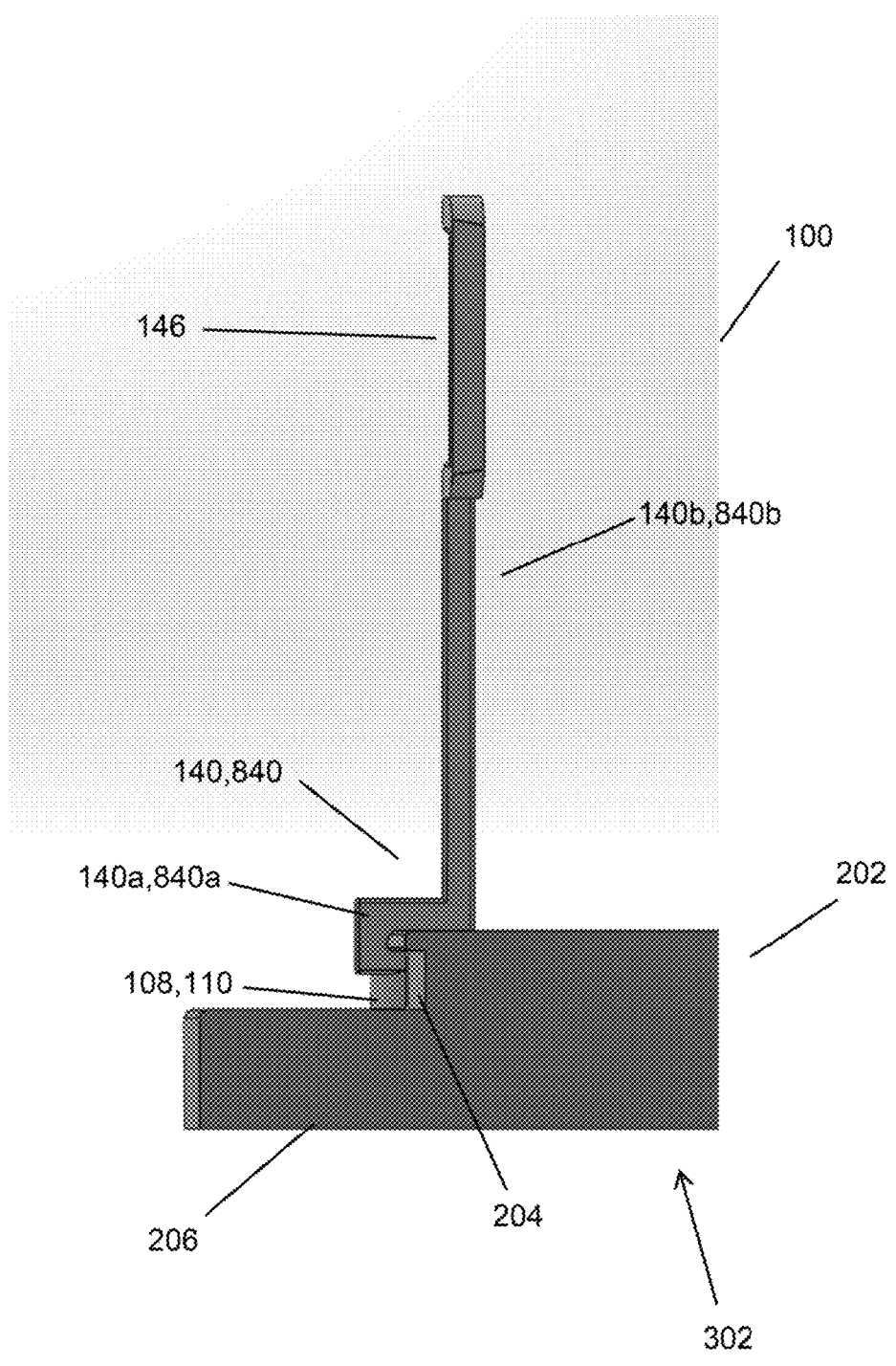
FIG. 42 is a right side view of another implementation of a tool placed in relation to a cross-sectional view showing an example of a groove for the placement of an implemented electrostatic chuck seal.

As shown in FIG. 17 and FIGS. 36-37, the base 140, particularly the rear surface 142, may mate against a portion of the component 302. In one implementation, as shown in FIG. 36, the support surface 145 or the grooved portion 145a of the support surface 145 of the arm 144 may mate against a portion of the component 302. The user lifts the seal 300 and positions it against the surface 110. The user may support the insertion tool 100 by supporting the base 140 with both hands. In another implementation, the user may support the insertion tool by supporting the arm 144 or the gripping portion 146 with one hand and the base 140 with the other hand.

The user then moves the insertion tool 100 along the perimeter of the component 302. In one implementation, the user moves the insertion tool 100 in a clockwise motion about the perimeter of the component 302. In another implementation wherein the thicker portion 114 is disposed in the center of the surface 110, the user may move the insertion tool in either a clockwise or counter-clockwise motion about the perimeter of the component 302. The user may make a plurality of revolutions around the perimeter with the insertion tool 100. In one implementation, the user may make one, two, three, four, five or six revolutions around the component 302. In another example implementation, the user makes three revolutions around the component 302.

As revolutions are made, the seal 300 is continuously lifted as it travels from the thicker portion 114, across the surface 110 towards the thinner portion 116. Prior to being lifted during a revolution, a portion of the seal 300 has a height $h_1$. As the seal 300 is being moved into the lifted position, the seal 300 is stretched such that the seal 300 has a height $h_2$, where $h_2$ is less than $h_1$. After being in the lifted position, the seal 300 travels across the surface 110, towards the thinner portion 116 and is disposed in the groove 304 to the unlifted position. Once in the unlifted position, the seal 300 returns substantially to its unstretched state with a height $h_1$. As revolutions are made with the insertion tool 100, the internal stresses of the elastomer in the seal 300 are relieved and the seal is placed in the groove 304 of the component 302.

The lifting, stretching, unlifting, and releasing of the seal 300 allow for placement of a seal 300, such as an electrostatic seal 200, within an associated groove 304 of a component 302, such as an electrostatic chuck 202, without the use of compressive forces which may damage the seal 300. An electrostatic seal 200 may have a height $h_1$ greater than or substantially equal to the height of an associated groove 204 on an electrostatic chuck 202. Use of the insertion tool 100 to stretch the electrostatic seal 200 by a percentage below its stress-strain curve and therefore decreasing its height $h_1$ to a lesser height $h_2$ allows the user to position the electrostatic seal 200 within the associated groove 204 where the electrostatic seal 200 will return substantially to its original height $h_1$ without being harmed.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An insertion tool comprising:
a base;
an arm comprising a first end and a second end; and
a seal lifting portion comprising a surface configured to selectably engage with a seal to move the seal between a lifted position and an unlifted position within an associated groove of a component,
wherein the seal has a first height h1 and a second height h2 when engaged with the seal lifting portion and the associated groove of the component, h2 being less than h1, the seal being stretched such that the height of the seal is reduced to h2 in the lifted position, the seal being returned to h1 in the unlifted position in the associated groove of the component,
wherein the second end of the arm is operably connected proximate a first end of the seal lifting portion, and
wherein the seal lifting portion is situated between the base and the arm, the base and the arm configured to maintain placement of the seal against at least a portion of the surface of the seal lifting portion.

2. The insertion tool of claim 1, wherein the surface of the seal lifting portion further comprises a thicker portion and a thinner portion, the thicker portion configured to adjust the seal to the lifted position and the thinner portion configured to guide the seal to the unlifted position in the associated groove of the component.

3. The insertion tool of claim 1, wherein the base further comprises a rear surface, the rear surface of the base shaped to complement a geometry of the component.

4. The insertion tool of claim 1, wherein the base is an arcuate base shaped to complement a geometry of the component.

5. The insertion tool of claim 1, wherein the base is a linear segment.

6. The insertion tool of claim 1, wherein the base further comprises a first end and a second end, a distance between the first end of the base and the second end of the base configured to maintain a substantially consistent distance between the seal lifting portion and the associated groove of the component.

7. The insertion tool of claim 1, wherein the base further comprises a gripping portion having a surface area sized to provide an operator control of the insertion tool.

8. The insertion tool of claim 1, wherein the first end of the arm further comprises a gripping portion having a surface area sized to provide an operator control of the insertion tool.

9. The insertion tool of claim 1, wherein the surface of the seal lifting portion is at least one surface selected from one or more of arcs, angled surfaces, and flat surfaces.

10. The insertion tool of claim 1, wherein the component is selected from one or more of electrostatic chucks, pumps, cylinders, connectors, and valves.

11. The insertion tool of claim 1, wherein the seal is selected from one or more of electrostatic seals, o-rings, gaskets, bellows, diaphragms, and wiper lips.

12. The insertion tool of claim 1, wherein the seal is selected from one or more of static seals and dynamic seals.

13. An insertion tool comprising:
a first segment comprising a first end and a second end;
a second segment substantially perpendicular to the first segment comprising a first end and a second end, the first end of the second segment operably connected to the second end of the first segment; and
a third segment substantially perpendicular to the second segment comprising a first end and a second end, the first end of the third segment operably connected to the second end of the second segment;
wherein, the first segment comprises a seal lifting portion configured to selectably engage with a seal to move the seal between a lifted position and an unlifted position within an associated groove of a component, and
wherein the seal lifting portion further comprises a surface configured such that the seal travels from a thicker portion of the surface towards a thinner portion of the surface, the thicker portion configured to adjust the seal to the lifted position and the thinner portion configured to guide the seal to the unlifted position in the associated groove of the component.

14. The insertion tool of claim 13, wherein the surface of the seal lifting portion is configured to selectably engage an electrostatic seal and the insertion tool is configured to move the seal between the lifted position and the unlifted position within an associated groove of an electrostatic chuck.

15. The insertion tool of claim 13, wherein a portion of the first segment is separable from the second segment.

\* \* \* \* \*